United States Patent
Siminoff

(10) Patent No.: US 12,380,784 B1
(45) Date of Patent: Aug. 5, 2025

(54) SHARING VIDEO FOOTAGE HAVING AUDIO/VIDEO RECORDING AND COMMUNICATION DEVICE MODEL IDENTIFIERS

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 482 days.

(21) Appl. No.: 16/245,108

(22) Filed: Jan. 10, 2019

(51) Int. Cl.
| | |
|---|---|
| H04N 7/08 | (2006.01) |
| G08B 13/196 | (2006.01) |
| G06F 3/04842 | (2022.01) |
| G06F 3/0485 | (2022.01) |
| G06Q 30/0207 | (2023.01) |
| H04L 67/01 | (2022.01) |

(52) U.S. Cl.
CPC ......... G08B 13/19656 (2013.01); H04N 7/08 (2013.01); *G06F 3/04842* (2013.01); *G06F 3/0485* (2013.01); *G06Q 30/0222* (2013.01); *H04L 67/01* (2022.05)

(58) Field of Classification Search
CPC ............................ G08B 13/19656; H04N 7/08
USPC ...................................................... 725/105
See application file for complete search history.

(56) References Cited

U.S. PATENT DOCUMENTS

| | | | |
|---|---|---|---|
| 4,764,953 | A | 8/1988 | Chern et al. |
| 5,428,388 | A | 6/1995 | von Bauer et al. |
| 5,760,848 | A | 6/1998 | Cho |
| 5,818,603 | A * | 10/1998 | Motoyama ............... G06F 3/12 358/296 |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1 | 8/2002 | Xin |
| 6,456,322 | B1 | 9/2002 | Marinacci |
| 6,476,858 | B1 | 11/2002 | Ramirez Diaz et al. |

(Continued)

FOREIGN PATENT DOCUMENTS

| | | |
|---|---|---|
| CN | 2585521 Y | 11/2003 |
| CN | 2792061 Y | 6/2006 |

(Continued)

*Primary Examiner* — Mushfikh I Alam
(74) *Attorney, Agent, or Firm* — Eversheds Sutherland (US) LLP

(57) ABSTRACT

Sharing video footage having audio/video (A/V) recording and communication device (A/V device) model identifiers in accordance with embodiments of the present disclosure are provided. In one embodiment, a method for communicating in a network is provided, the method comprising receiving, from a first audio/video (A/V) recording and communication device (A/V device), at one or more servers in network communication with the first A/V device, first image data captured by a camera of the first A/V device; receiving, from a first client device associated with the first A/V device, at the server(s), a command to share the first image data with a network of users; determining a model identifier associated with the first A/V device; and transmitting the first image data and the model identifier associated with the first A/V device to a second client device of at least one user of the network of users.

27 Claims, 15 Drawing Sheets

(56) References Cited

U.S. PATENT DOCUMENTS

| | | | |
|---|---|---|---|
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 7,834,904 B2* | 11/2010 | Brookins | G08B 13/19645 348/143 |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,872,915 B1 | 5/2014 | Scalisi et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,898,150 B1* | 11/2014 | Kuramochi | G06F 16/58 707/722 |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,332,233 B2* | 5/2016 | Yanagidate | H04N 5/772 |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 10,003,762 B2* | 6/2018 | Jung | H04N 23/90 |
| 10,554,872 B2* | 2/2020 | Fan | H04N 23/661 |
| 10,893,238 B2* | 1/2021 | Eilertsen | H04N 7/181 |
| 11,165,987 B2* | 11/2021 | Harpole | H04N 21/6587 |
| 11,372,537 B2* | 6/2022 | Ye | G06F 3/04845 |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2003/0184682 A1* | 10/2003 | Kobayashi | H04N 5/445 348/589 |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2006/0206393 A1* | 9/2006 | Brown | G06Q 30/06 705/26.1 |
| 2007/0008081 A1 | 1/2007 | Tylicki et al. | |
| 2010/0118748 A1* | 5/2010 | Pratt | H04N 21/234336 370/310 |
| 2010/0225455 A1 | 9/2010 | Claiborne et al. | |
| 2012/0150598 A1* | 6/2012 | Griggs | G06Q 20/384 705/14.16 |
| 2013/0057695 A1 | 3/2013 | Huisking | |
| 2013/0265450 A1* | 10/2013 | Barnes, Jr. | H04N 5/77 348/207.1 |
| 2014/0006165 A1* | 1/2014 | Grigg | G06Q 30/0207 705/14.64 |
| 2014/0267716 A1 | 9/2014 | Child et al. | |
| 2015/0149284 A1* | 5/2015 | Williams | G06Q 30/0251 705/14.56 |
| 2015/0163463 A1 | 6/2015 | Hwang et al. | |
| 2015/0188870 A1* | 7/2015 | Sharp | H04L 51/22 715/752 |
| 2016/0099941 A1* | 4/2016 | Hein | H04L 67/125 726/4 |
| 2016/0110772 A1* | 4/2016 | Herring | G07G 1/0045 705/14.66 |
| 2016/0337191 A1* | 11/2016 | Li | H04W 24/02 |
| 2017/0185251 A1* | 6/2017 | Jain | H04L 67/02 |
| 2017/0251035 A1* | 8/2017 | Siminoff | G08B 13/19671 |
| 2017/0310888 A1* | 10/2017 | Wright | H04N 5/772 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

\* cited by examiner

900

```
RECEIVE FIRST IMAGE DATA FROM A FIRST A/V
RECORDING AND COMMUNICATION DEVICE
B902
```

```
RECEIVE A SHARE SIGNAL, INCLUDING A COMMAND TO
SHARE THE FIRST IMAGE DATA WITH A NETWORK OF
USERS, FROM A FIRST CLIENT DEVICE
B904
```

```
DETERMINE A MODEL IDENTIFIER ASSOCIATED WITH THE
FIRST A/V RECORDING AND COMMUNICATION DEVICE
B906
```

```
GENERATE A NEIGHBORHOOD ALERT SIGNAL
B908
```

```
TRANSMIT THE NEIGHBORHOOD ALERT SIGNAL TO AT
LEAST ONE USER OF THE NETWORK OF USERS
B910
```

FIGURE 9

SHARING VIDEO FOOTAGE HAVING AUDIO/VIDEO RECORDING AND COMMUNICATION DEVICE MODEL IDENTIFIERS

TECHNICAL FIELD

The present embodiments relate to audio/video (A/V) recording and communication devices (A/V devices), including A/V doorbells, security cameras, and floodlight controllers. In particular, the present embodiments relate to improvements in the functionality of A/V devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V devices, such as video doorbells, provide this functionality, and can also aid in crime detection and prevention. For example, audio and/or video captured by an A/V device can be uploaded to the cloud and recorded on a remote server. Subsequent review of the A/V footage can aid law enforcement in capturing perpetrators of home burglaries and other crimes. Further, the presence of one or more A/V devices on the exterior of a home, such as a doorbell unit at the entrance to the home, acts as a powerful deterrent against would-be burglars.

BRIEF DESCRIPTION OF THE DRAWINGS

The various embodiments of the present sharing video footage having A/V device model identifiers now will be discussed in detail with an emphasis on highlighting the advantageous features. These embodiments depict the novel and non-obvious sharing video footage having A/V device model identifiers shown in the accompanying drawings, which are for illustrative purposes only. These drawings include the following figures, in which like numerals indicate like parts:

FIG. 9 is a flowchart illustrating an example process for generating and transmitting a neighborhood alert signal including a model identifier of a first A/V device according to various aspects of the present disclosure;

DETAILED DESCRIPTION

Figure 1A:
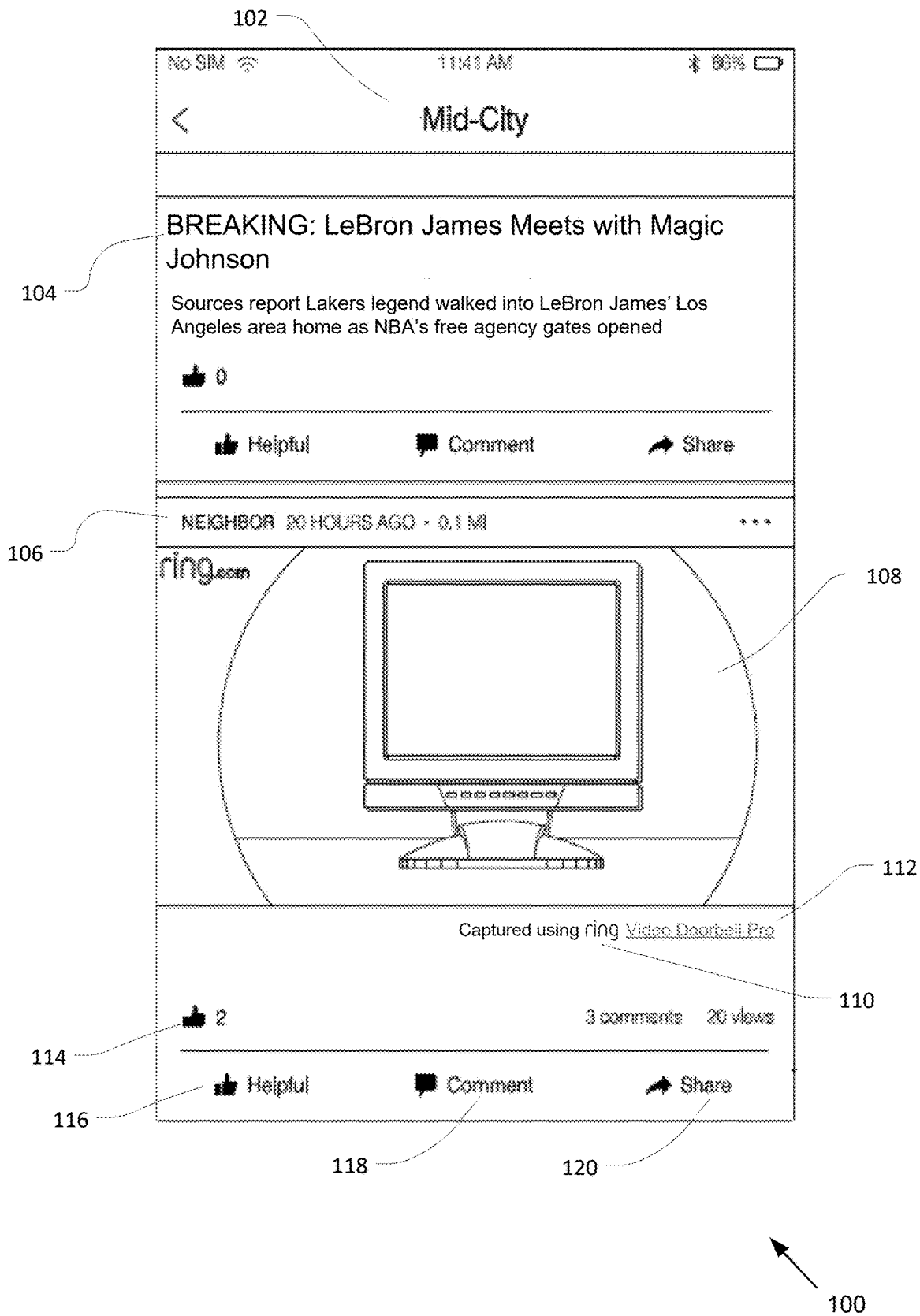
FIG. 1A is a screenshot of a GUI illustrating aspects of a neighborhood alerts feed having a model identifier according to various aspects of the present disclosure.

One aspect of the present embodiments includes the realization that users of audio/video (A/V) recording and communication devices (A/V devices) may from time to time desire to share video footage recorded by their devices. For example, when an A/V device records video footage of suspicious activity, or even criminal activity, a user viewing the footage may desire to alert his or her neighbors to the possible danger posed by the person(s) involved in the suspicious or criminal activity. It would be advantageous, then, to enhance the functionality of A/V devices by facilitating easy sharing of video footage recorded by such devices with one's neighbors. In another example, an A/V device may record video footage of activity that may be of interest to the user's friends and family (e.g., images of children playing in the yard). It would be advantageous, then, to enhance the functionality of A/V devices by facilitating easy sharing of video footage recorded by such devices with one's friends and family. The present embodiments, as described in detail below, provide these, and other, enhancements. In particular, the present embodiments improve upon and solve the problem of video footage captured by A/V devices being accessible only to the owner of the A/V device, which limits the ability of such devices to help stop crime.

Another aspect of the present embodiments includes the realization that in current A/V devices other than the present embodiments, members of a neighborhood (may also be referred to as "network of users") receiving the shared video footage may not own an A/V device. For example, a neighborhood may include a grouping of members (may also be referred to as "users") sharing information using a neighborhood platform running on each user's client device. The neighborhood platform may include a neighborhood alert feed that allows members to post videos, photos, and/or texts to alert other members of activity in the neighborhood using a share signal. Some members may own A/V device(s) that record video footage that may be shared to other members, while some members may not own such A/V device(s). However, when more users in a neighborhood own A/V devices, more video footage may be recorded and shared to the neighborhood, which may increase the safety of the neighborhood. The present embodiments solve these problems by providing a neighborhood alert signal that shares video footage along with a model identifier of the A/V device that captured the shared video footage. Further, the neighborhood alert signal may include a hyperlink to more information about A/V devices such as, but not limited, to A/V device corresponding to the model identifier. In addition, the neighborhood alert signal may allow a person receiving the neighborhood alert signal to purchase one or more A/V devices, including, but not limited to, A/V devices corresponding to the model identifier. The present embodiments thus advantageously encourage more members of a neighborhood to purchase A/V devices and contribute video footage to the neighborhood to improve neighborhood safety. The present embodiments provide these advantages and enhancements, as described below.

As described herein, the present sharing video footage from audio/video A/V devices using neighborhood alert signals may include model identifiers of the A/V devices that captured the shared video footage. For example, a first A/V device may be associated with a model identifier such as, but not limited to, a make, model, serial number, product version, and/or any other identifier that identifies a particular product classification of A/V devices. In many embodiments, the first A/V device may be configured to capture first image data using a camera having a field of view and further configured to transmit the first image data to one or more servers. In various embodiments, a first user may use a first client device to transmit a share signal indicating the first user's desire to share the first image data with a neighborhood (may also be referred to as a "network of users"). Upon receiving the share signal, the server(s) may determine the model identifier associated with the first A/V device. Further, the server(s) may generate a neighborhood alert signal that includes the first image data and the model identifier associated with the first A/V device. In addition, the server(s) may transmit the neighborhood alert signal to at least one user of the network of users (e.g., a second user) in sharing the first image data. As described further below, the neighborhood alert signal that includes the model identifier may be displayed on a client device (e.g., a second client device) associated with the at least one user of the network of users. In some embodiments, the neighborhood alert signal may also include a hyperlink to a website that provides information about A/V devices (e.g., a second A/V device) corresponding to the model identifier.

In many embodiments, the neighborhood alert signal and/or the first image data may facilitate the purchase of A/V devices corresponding to the model identifier. For example, a second user may receive the neighborhood alert signal and may be provided with information about A/V devices corresponding to the model identifier. Further, in various embodiments, a discount amount may be determined and applied to the purchase of A/V devices corresponding to the model identifier (e.g., a second A/V device) based on various factors such as, but not limited to, the contents of the first image data, the second user's engagement with the first image data, and/or a density of users in the network of users, as further described below. Thus, shared video footage that includes model identifiers may encourage and facilitate other users to purchase A/V devices and to contribute additional video footage to the neighborhood, thereby increasing neighborhood safety, as further described below.

The remaining detailed description describes the present embodiments with reference to the drawings. In the drawings, reference numbers label elements of the present embodiments. These reference numbers are reproduced below in connection with the discussion of the corresponding drawing features.

FIG. 1A is a screenshot of a graphical user interface (GUI) 100 illustrating aspects of a neighborhood alerts feed having a model identifier, according to various aspects of the present disclosure. The GUI 100 may be presented to a user (e.g., a second user) upon selecting a neighborhood icon on a user's client device (e.g., a second client device(s)). In various embodiments, the GUI 100 may include a neighborhood identifier Mid-City 102, an alerts feed that presents posts and/or alerts (may also be referred to as "neighborhood alert signals") from various members of a neighborhood, one or more servers, and/or third-party sources, as further described below. For example, the GUI 100 may include a news feed post 104 (the term "post" may also be referred to as an "alert") that includes one or more news items from the server(s) and/or a third-party content source. Further, the GUI 100 may include a neighborhood alert 106 (may also be referred to as a "neighborhood alert signal") that includes image data 108 captured by a camera of an A/V recording and communication device (e.g., a first A/V recording and communication device (A/V device)), as further described below. In many embodiments, the neighborhood alert signal 106 may also include a model identifier 110 associated with the A/V device that captured the first image data 108. In some embodiments, the neighborhood alert signal 106 may also include a hyperlink 112 that redirects the second user to a website and/or an additional post that provides more information about A/V device(s) corresponding to the model identifier 110. In some embodiments, the hyperlink 112 and the model identifier 110 may be integrated into a single component (e.g., a hyperlink). In other embodiments, the hyperlink 112 and the model identifier 110 may be separate components.

In reference to FIG. 1A, a second user's level of engagement with the first image data 108 may be used to determine a discount amount for purchasing A/V devices corresponding to the model identifier 110. For example, the neighborhood alert 106 may include a thumbs-up icon 114 indicating positive affirmation that keeps count of the number of times a post has been liked by users of the particular neighborhood, or by users of all neighborhoods. The neighborhood alert 106 may also include a Helpful icon 116 that allows the second user to indicate that he or she found the particular post to be helpful, indicating positive affirmation. Further, the neighborhood alert 106 may include a Comment icon 118 that allows the second user to input comments regarding the post, and the comments may be presented to other members of the neighborhood as they view the post. In addition, the neighborhood alert 106 may also include a Share icon 120 that allows the second user to share the neighborhood alert 106 to other members of the neighborhood, or to members of other neighborhoods. In many embodiments, the second user's engagement with the first image data 108 may be determined by measuring the second user's engagement with the various icons (e.g., thumbs-up icon 114, Helpful icon 116, Comment icon 118, Share icon 120) and/or other user engagement measures, as further described below.

Figure 1B:
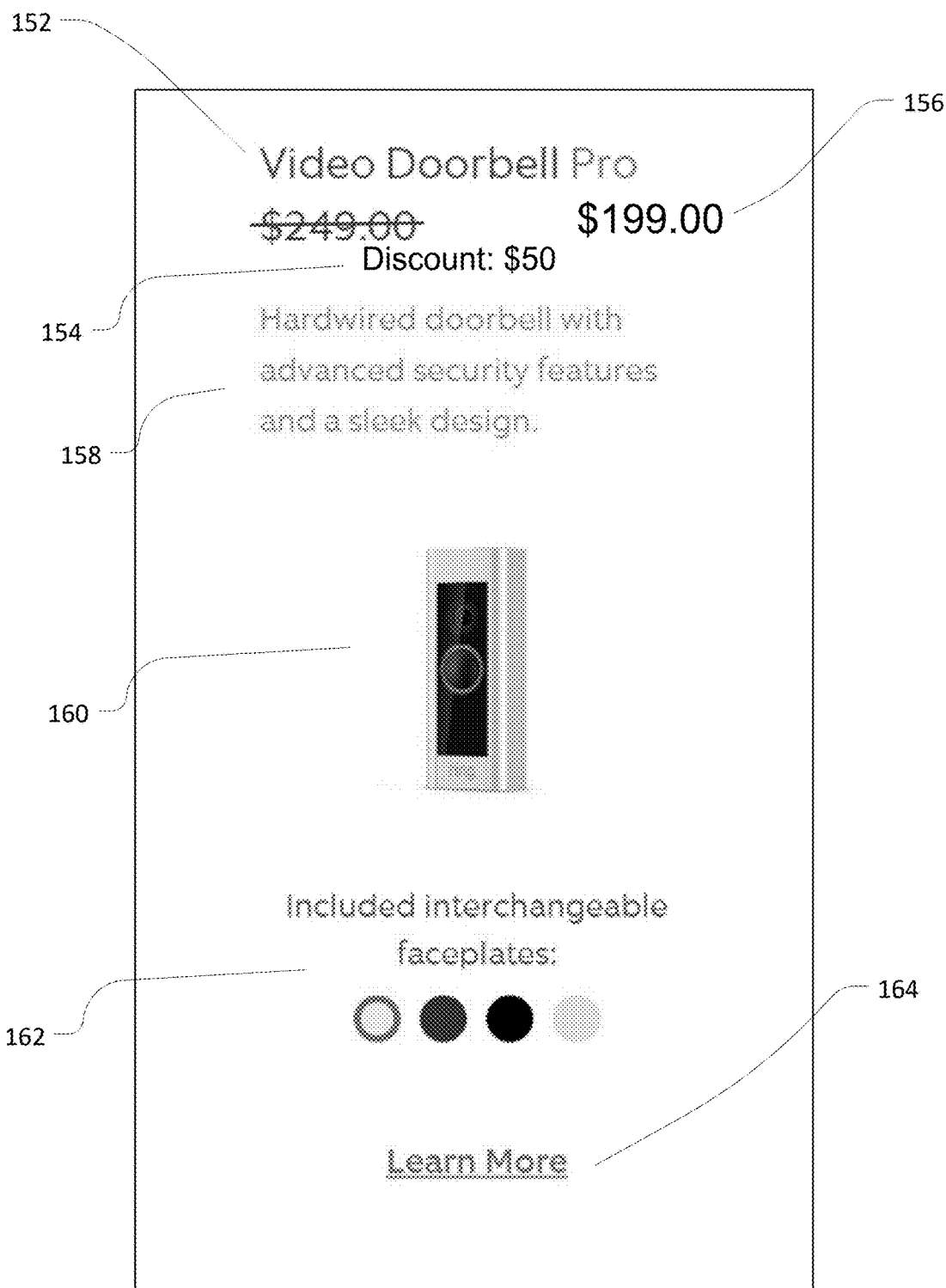
FIG. 1B is a screenshot of a GUI illustrating a website providing information about A/V devices corresponding to the model identifier in FIG. 1A according to various aspects of the present disclosure.

FIG. 1B is a screenshot of a GUI 150 illustrating a website providing information about A/V devices corresponding to the model identifier 110 of FIG. 1A, according to various aspects of the present disclosure. As described further below, the second user's selection of the hyperlink 112 may result in displaying, on the second client device, a website that provides information about the A/V device(s) corresponding to the model identifier 110. In many embodiments, the GUI 150 may include a model identifier 152 that corresponds to the model identifier 110. Further, the GUI 150 may include a discount amount 154, which may be determined as further described below. In some embodiments, the GUI 150 may also include the price 156 after applying the discount amount for purchasing a second A/V device corresponding to the model identifier 110, 152. Further, the GUI 150 may include additional information about A/V devices corresponding to the model identifier, including a textual description 158, an image 160, available options 162, etc. In some embodiments, the GUI 150 may include a further hyperlink 164 for even more information about A/V devices corresponding to the model identifier and/or for purchasing the second A/V device corresponding to the model identifier, as further described below. In some embodiments, the GUI 150 may include additional A/V devices corresponding to other model identifiers that the second user may consider for purchase. Further, in some embodiments, the GUI 150 may allow for the second user to directly purchase one or more A/V devices without being redirected from the GUI 150.

Figure 2:
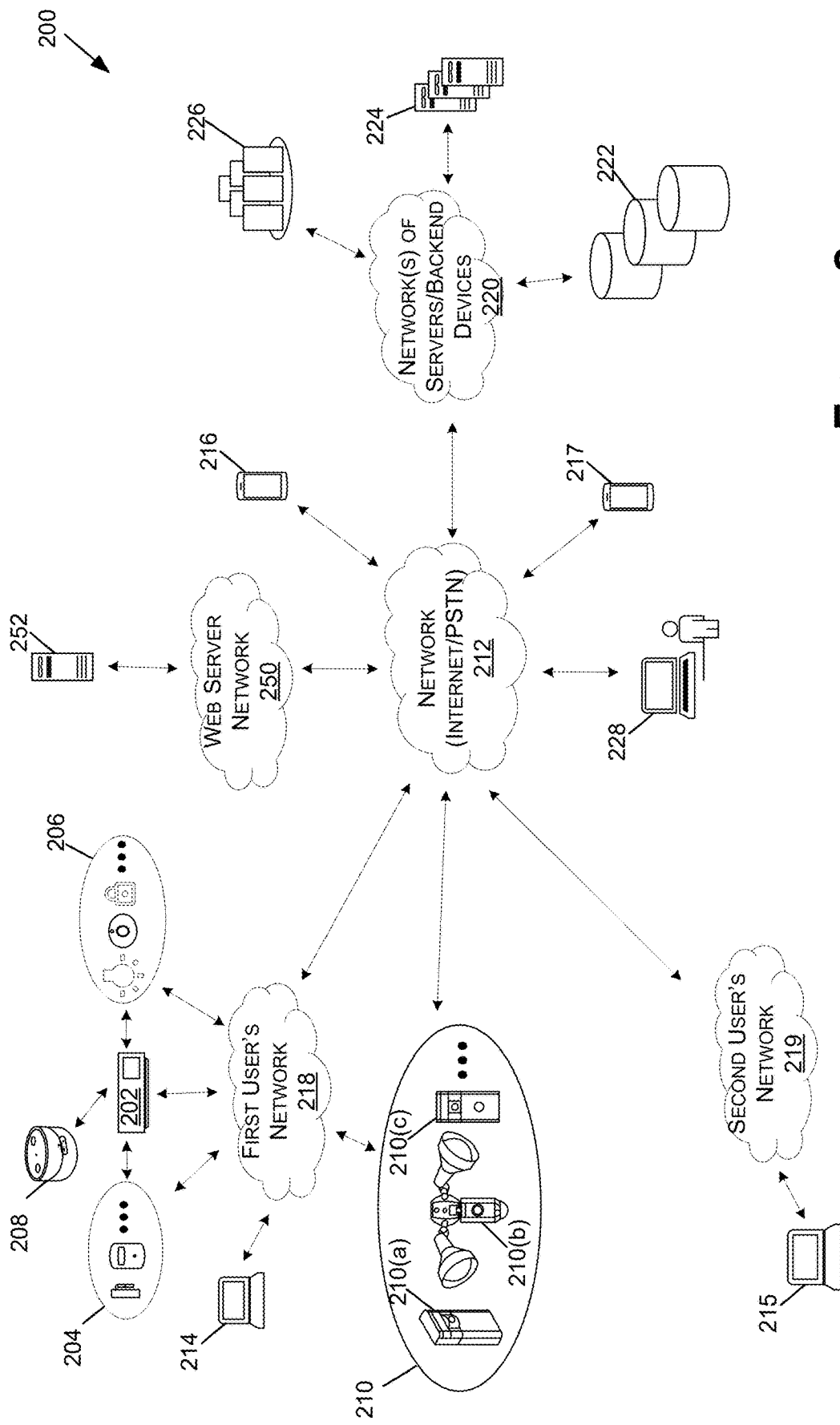
FIG. 2 is a functional block diagram illustrating a system for communicating in a network according to various aspects of the present disclosure.

FIG. 2 is a functional block diagram illustrating a system 200 for communicating in a network according to various aspects of the present disclosure. As described above, backend devices (e.g., one or more servers) may be configured to receive output signal(s) from a first A/V device that includes first image data captured by a camera of the first A/V device. In some embodiments, the server(s) may receive a share signal from a first client device associated with the first A/V device that includes a command to share the first image data with a network of users, as further described below. In many embodiments, the server(s) may determine a model identifier associated with the first A/V device and generate a neighborhood alert signal that includes the first image data and the model identifier, as further described below. In various embodiments, the server(s) may transmit the neighborhood alert signal to at least one user of the network of users (e.g., a second user) who may obtain more information and/or purchase A/V device(s) (e.g., a second A/V device) corresponding to the model identifier, as further described below.

With reference to FIG. 2, the system 200 may include one or more first A/V recording and communication devices 210 (alternatively referred to herein as "first A/V devices 210" or "first A/V device 210"). The first A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The first A/V devices 210 may be configured to access a first user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3. In various embodiments, the first A/V devices 210 may be associated with a model identifier, as described further below. In many embodiments, the first A/V device 210 may be configured to capture first image data, first audio data, and/or first text data and transmit an output signal to a backend device (e.g., one or more storage devices 222, the server(s) 224, and/or one or more APIs 226), as further described below. Further, the system 200 may also include one or more first client devices 214, 216, which may be configured to be in network communication with the first A/V devices 210, and various smart home devices (e.g., a smart-home hub device 202, sensors 204, automation devices 206, a virtual assistant (VA) device 208, etc.), as further described below. In some embodiments, the first client device 214 may access the Network (Internet/PSTN) 212 using the first user's network 218. In some embodiments, the first client device 216 may access the Network (Internet/PSTN) 212 without using the first user's network 218, for example, by using a cellular network. In some embodiments, the first client devices 214, 216 may both access the Network (Internet/PSTN) 212 using the first user's network 218 or using some other network such as, but not limited, to a cellular network. In many embodiments, the devices connected to the first user's network 218 (e.g., the first A/V devices 210, the smart-home hub device 202, the sensors 204, the automation devices 206, the VA device 208, and/or the first client device 214) and the first client device 216 may be associated with a first user. As further described below, the first user may use the first client device 214, 216 to transmit a share signal that includes a command to share the first image data, first audio data, and/or first text data with a network of users such as, but not limited to, a second user.

In further reference to FIG. 2, the system 200 may also include one or more second client devices 215, 217 associated with the second user. In some embodiments, the second client device 215 may access the Network (Internet/PSTN) 212 using the second user's network 219. In some embodiments, the second client device 217 may access the Network (Internet/PSTN) 212 without using the second user's network 219, for example, by using a cellular network. In some embodiments, the second client devices 215, 217 may both access the Network (Internet/PSTN) 212 using the second user's network 219 or using some other network such as, but not limited, to a cellular network. In various embodiments, the second user may be associated with a second location, as described below. In various embodiments, the second client devices 215, 217 may be used by the second user to receive a neighborhood alert signal that may include first image data captured by the first A/V device 210 and a model identifier associated with the first A/V device 210, as further described below. Further, the neighborhood alert signal may allow the second user to purchase one or more A/V devices corresponding to the model identifier, as further described below.

In further reference to FIG. 2, the first A/V devices 210 may be part of a home security system. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, VA device 208, first A/V devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the first client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the sensors 204, the automation devices 206, the VA device 208, the first A/V devices 210, and/or the first client devices 214, 216 may use one or more wired and/or wireless communication protocols to communicate, including, for example and without limitation, Wi-Fi (e.g., the first user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like. The first user's network 218 and/or the second users' network 219 may be, for example, a wired and/or wireless network. If the first and/or second users' network 218, 219 is wireless, or includes a wireless component, the first and/or second users' network 218, 219 may be a Wi-Fi network compatible with the IEEE 802.11 standard and/or other wireless communication standard(s). Furthermore, the first and/or second users' network 218, 219 may be connected to other networks such as the network 212, which may comprise, for example, the Internet and/or PSTN.

The system 200 may further include the smart-home hub device 202 (which may alternatively be referred to herein as the "hub device 202"). The smart-home hub device 202 may be connected to the first user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more first A/V devices 210. For example, the smart-home hub device 202 may be a component of a security system and/or a home automation system installed at a location (e.g., a property, a premises, a home, a business, etc.). In some embodiments, the first A/V devices 210, the sensors 204, the automation devices 206, and/or the VA device 208, communicate with the smart-home hub device 202 directly and/or indirectly using one or more wireless and/or wired communication protocols (e.g., BLE, Zigbee, Z-Wave, etc.), the first user's network 218 (e.g., Wi-Fi, Ethernet, etc.), and/or the network (Internet/PSTN) 212. In some of the present embodiments, the first A/V devices 210, the sensors 204, the automation devices 206, and/or the VA device 208, may, in addition to or in lieu of communicating with the smart-home hub device 202, communicate with the first client devices 214, 216, the VA device 208, and/or one or more of components of the network of servers 220 directly and/or indirectly via the first user's network 218 and/or the network (Internet/PSTN) 212.

As illustrated in FIG. 2, the system 200 may include the VA device 208. The VA device 208 may be connected to the first user's network 218 and/or the network (Internet/PSTN) 212. The VA device 208 may include an intelligent personal assistant, such as, without limitation, Amazon Alexa and/or Apple Siri. For example, the VA device 208 may be configured to receive voice commands, process the voice commands to determine one or more actions and/or responses (e.g., transmit the voice commands to the one or more components of the network of servers 220 for processing), and perform the one or more actions and/or responses, such as to activate and/or change the status of one or more of the sensors 204, the automation devices 206, or the first A/V devices 210. In some embodiments, the VA device 208 is configured to process user inputs (e.g., voice commands) without transmitting information to the network of servers 220 for processing. The VA device 208 may include at least one speaker (e.g., for playing music, for outputting the audio data generated by the first A/V devices 210, for outputting the voice of a digital assistant, etc.), at least one a microphone (e.g., for receiving commands, for recording audio data, etc.), and a display (e.g., for displaying a user interface, for displaying the image data generated by the first A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the first client devices 214, 216, the first A/V devices 210, the smart-home hub device 202, the sensors 204, the automation devices 206, and the VA device 208, may be referred to as a security system and/or a home-automation system. The security system and/or home-automation system may be installed at location, such as a property, home, business, or premises for the purpose of securing and/or automating all or a portion of the location.

As described above, the system 200 may further include one or more first client devices 214, 216 that may communicate with and/or be associated with (e.g., capable of access to and control of) the first A/V devices 210, a smart-home hub device 202, the sensors 204, the automation devices 206, and/or the VA device 208. In various embodiments, the first client devices 214, 216 communicate with other devices using one or more wireless and/or wired communication protocols, the first user's network 218, and/or the network (Internet/PSTN) 212, as described herein. The first client devices 214, 216 may comprise, for example, a mobile device such as a smartphone or a personal digital assistant (PDA), or a computing device such as a tablet computer, a laptop computer, a desktop computer, etc. In some embodiments, the first client devices 214, 216 includes a connected device, such as a smart watch, Bluetooth headphones, another wearable device, or the like. In such embodiments, the first client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.). Similarly, in various embodiments, the second client devices 215, 217 communicate with other devices using one or more wireless and/or wired communication protocols, the second user's network 219, and/or the network (Internet/PSTN) 212, as described herein. The second client devices 215, 217 may comprise, for example, a mobile device such as a smartphone or a personal digital assistant (PDA), or a computing device such as a tablet computer, a laptop computer, a desktop computer, etc. In some embodiments, the second client devices 215, 217 includes a connected device, such as a smart watch, Bluetooth headphones, another wearable device, or the like. In such embodiments, the second client devices 215, 217 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The first A/V devices 210, the hub device 202, the sensors 204, the automation devices 206, the VA device 208, and/or the first client devices 214, 216 may also communicate, via the first user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more servers 224, and one or more application programming interfaces (APIs) 226. While FIG. 2 illustrates the storage device(s) 222, the server(s) 224, and the API(s) 226 as components separate from the network 220, it is to be understood that the storage device(s) 222, the server(s) 224, and/or the API(s) 226 may be considered to be components of the network 220. For example, the network 220 may include a data center with a plurality of computing resources used to implement the storage device(s) 222, the server(s) 224, and the API(s) 226.

The server(s) 224 may comprise a computer program or other computer executable code that, when executed by processor(s) of the server(s) 224, causes the server(s) 224 to wait for requests from other computer systems or software (clients) and provide responses. In an embodiment, the server(s) 224 shares data and/or hardware and/or software resources among the first client devices 214, 216 and/or the second client devices 215, 217. This architecture is called the client-server model. The first client devices 214, 216 and/or the second client devices 215, 217 may run on the same computer or may connect to the server(s) 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The API(s) 226 may comprise, for example, a server (e.g., a real server, or a virtual machine, or a machine running in a cloud infrastructure as a service), or multiple servers networked together, exposing at least one API to clients. In various embodiments, the API(s) 226 is provided by servers including various components such as an application server (e.g., software servers), a caching layer, a database layer, or other components suitable for implementing one or more APIs. The API(s) 226 may, for example, comprise a plurality of applications, each of which communicate with one another using one or more public APIs. In some embodiments, the API(s) 226 maintains user data and provides user management capabilities, thereby reducing the load (e.g., memory and processor consumption) of the first client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The API(s) 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the server(s) 224) running on one or more computers (such as a dedicated server computer offering multiple services) and accessed via a network by client components running on other devices (e.g., first client devices 214, 216 and/or second client devices 215, 217). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the first user's network 218, the second user's network 219, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VOLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

With further reference to FIG. 2, the system 200 may also include one or more web server(s) 252 that may assist with and/or facilitate purchasing of A/V devices such as, but not limited to, the second A/V device by the second user. In some embodiments, the web server(s) 252 be configured to connect to the network (Internet/PSTN) 212 using a web server network 250. In some embodiments, the web server(s) 252 may be a third-party service that is not associated with the same company that manufactures, sells, and/or distributes the first and/or second A/V devices. In some embodiments, the web server(s) 252 may be one of the backend devices (e.g., the server(s) 224, the API(s) 226, the storage devices 222) that connects to the Network (Internet/PSTN) 212 using the network 220. In some embodiments, the web server(s) 252 may be part of the server(s) 224. As further described below, the neighborhood alert signal may include a hyperlink that directs the second user to a website, that may be provided by the web server(s) 252, for purchasing A/V devices. In some embodiments, some or all of the functionalities of the web server(s) 252, including providing and/or storing website(s), may be performed by the backend devices (e.g., the server(s) 224, the API(s) 226, the storage devices 222, etc.).

With further reference to FIG. 2, the system 200 may also include a security monitoring service 228. The security monitoring service 228 may be operated by the same company that manufactures, sells, and/or distributes the first A/V devices 210, the hub device 202, the sensors 204, the automation devices 206, and/or the VA device 208. In other embodiments, the security monitoring service 228 may be operated by a third-party company (e.g., a different company than the one that manufactured, sold, and/or distributed the first A/V devices 210, the hub device 202, the sensors 204, the automation devices 206, and/or the VA device 208). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers for monitoring and/or controlling security systems. In such an example, the first A/V devices 210, the hub device 202, the sensors 204, the automation devices 206, and/or the VA device 208 may communicate with the first client devices 214, 216 and/or one or more components of the network of servers of the security monitoring service 228 over the network (Internet/PSTN) 212 (in some embodiments, via one or more of the components of the network of servers/backend devices 220).

The first A/V devices 210, first client devices 214, 216, second client devices 215, 217, hub device 202, the sensors 204, the automation devices 206, the VA device 208, the web server(s) 252, the security monitoring services 228, and/or any of the components of the network(s) of servers/backend devices 220 (e.g., the server(s) 224, the API(s) 226, the storage devices 222, etc.) may be referred to herein as a "network device" or "network devices."

Figure 3:
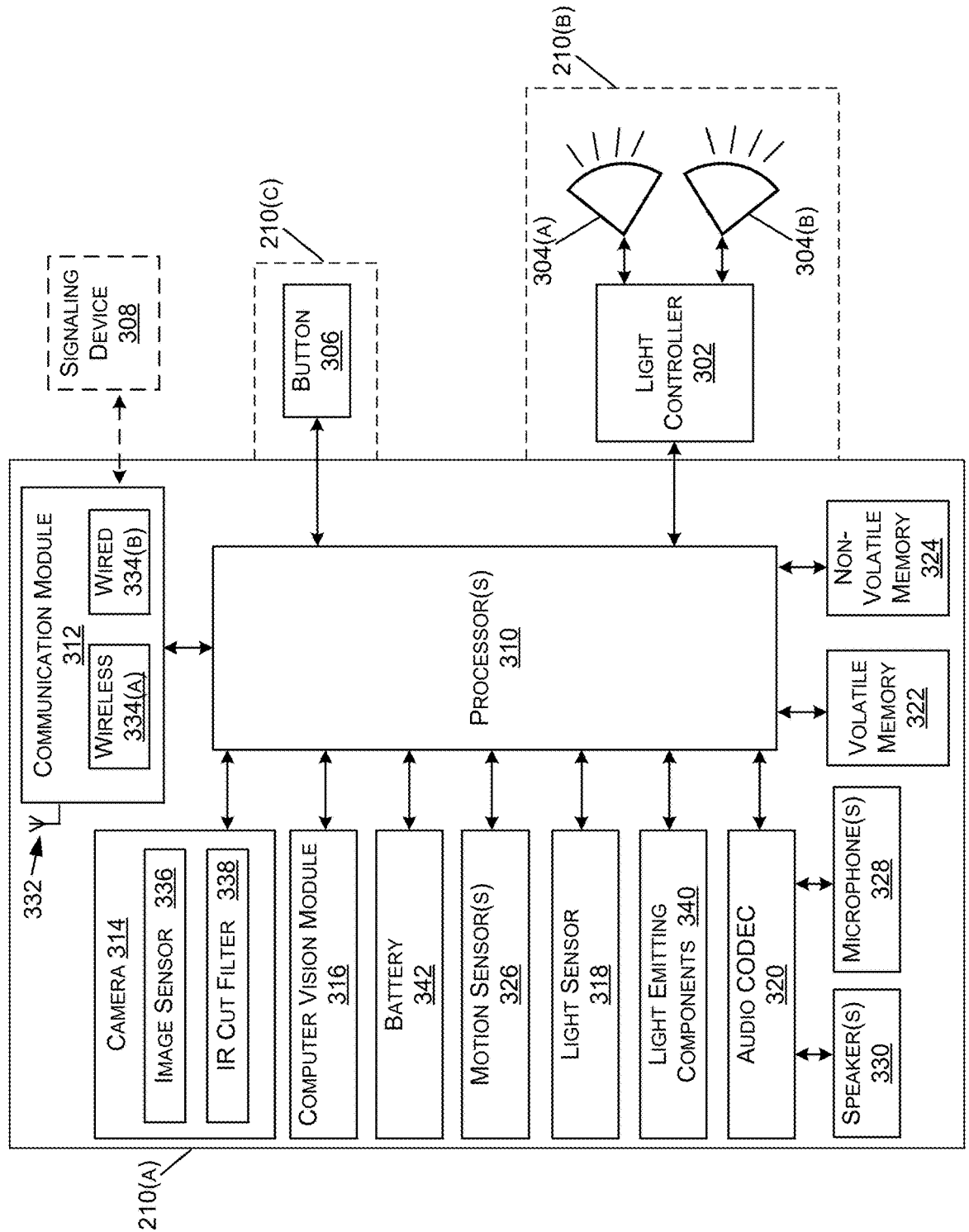
FIG. 3 is a functional block diagram of an A/V device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the first A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the first A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the first A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the first A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the first A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the first A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the A/V device 210 may comprise the light sensor 318 and the one or more light-emitting components 340, such as LED's. The light sensor 318 may be one or more sensors capable of detecting the level of ambient light of the surrounding environment in which the first A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The first A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the first A/V device 210 may include two or more microphone(s) 328 that are spaced from one another (e.g., located on different sides of the first A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the first A/V device 210 speaks, sound from the visitor (or intruder) is received by the microphone(s) 328 and compressed by the audio CODEC 320. Digital audio data is then sent through the communication module 312 to the network 212 via the user's network 218, routed by the server(s) 224 and/or the API(s) 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the first A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the first A/V device 210 may include an integrated circuit (not shown) capable of arbitrating between multiple voltage rails, thereby selecting the source of power for the first A/V device 210. The first A/V device 210 may have separate power rails dedicated to the battery 342 and the AC power source. In one aspect of the present disclosure, the first A/V device 210 may continuously draw power from the battery 342 to power the first A/V device 210, while at the same time routing the AC power to the battery, thereby allowing the battery 342 to maintain a substantially constant level of charge. Alternatively, the first A/V device 210 may continuously draw power from the AC power to power the doorbell, while only drawing from the battery 342 when the AC power is low or insufficient. Still, in some embodiments, the battery 342 comprises the sole source of power for the first A/V device 210. In such embodiments, the components of the first A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the first A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the first A/V device 210 so as to reduce interference from heat, pressure, moisture, and/or other stimuli generated by the internal components of the first A/V device 210.

With further reference to FIG. 3, the first A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the first A/V device 210.

In some embodiments, computer vision module(s) (CVM) 316 may be included in the first A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the first A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the first A/V device 210, etc. In various embodiments, the motion sensor(s) 326 include a plurality of different sensor types capable of detecting motion such as PIR, AIR, low-power CVM, and/or cameras.

As indicated above, the first A/V device 210 may include the CVM 316 (which may be the same as the above described low-power CVM 316 implemented as one or more motion sensor(s) 326, or may be additional to, or alternative from, the above described low-power CVM 316). For example, the first A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the first A/V device 210, the computer vision module 316 may additionally, or alternatively, be included as a component of the hub device 202, the VA device 208, and/or one or more components of the network of servers/backend devices 220. With respect to the first A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the first A/V device 210 includes a light camera, the first A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data.

The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the first A/V device 210 includes a doorbell, such as the video doorbell 210(*c*), the first A/V device 210 may include the button 306. In embodiments where the button 306 is a mechanical button (e.g., has a range of movement), the button 306 may make contact with a button actuator located within the video doorbell 210(*c*) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(*c*), such as transmitting an output signal, using the communication module 312, to the signaling device 308 to cause the signaling device 308 to output a sound (e.g., via the wired 334(*b*) connection to the signaling device 308 and/or a wireless 334(*a*) connection to the signaling device 308). In addition, the processor(s) 310 may transmit an output signal (e.g., a message), using the communication module 312, to the first client device(s) 214, 216 to indicate to the user(s) of the first client device(s) 214, 216 that a person is present at the first A/V device 210 (in some embodiments, via at least one of the hub device 202, the VA device 208, and/or one or more component of the network of servers/backend devices 220).

Although the first A/V device 210 (or first A/V device 210) is referred to herein as an "audio/video" device, the first A/V device 210 need not have both audio and video functionality. For example, in some embodiments, the first A/V device 210 may not include the speakers 330, microphones 328, and/or audio CODEC. In such examples, the first A/V device 210 may only have video functionalities. In other examples, the first A/V device 210 may only have the speaker(s) 330 and not the microphone(s) 328, or may only have the microphone(s) 328 and not the speaker(s) 330.

Figure 4:
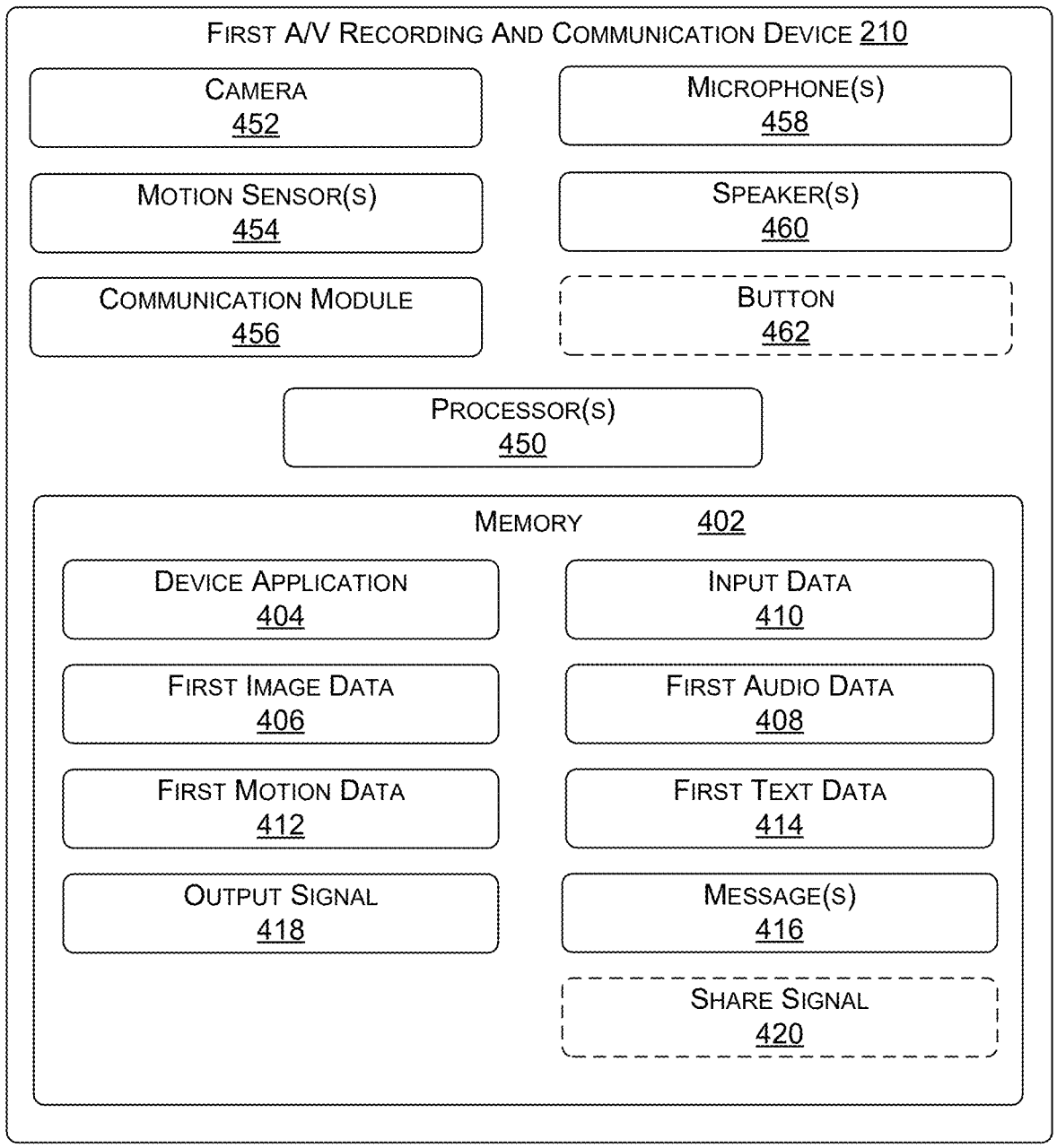
FIG. 4 is a functional block diagram illustrating one example embodiment of a first A/V device according to various aspects of the present disclosure.

FIG. 4 is a functional block diagram illustrating one example an embodiment of the first A/V device 210 according to various aspects of the present disclosure. In some embodiments, the first A/V device 210 may represent, and further include one or more of the components from, the first A/V security camera 210(*a*), the first floodlight controller 210(*b*), and/or the first A/V doorbell 210(*c*). Additionally, in some embodiments, the first A/V device 210 may omit one or more of the components shown in FIG. 4 and/or may include one or more additional components not shown in FIG. 4.

As shown in FIG. 4, the first A/V device 210 includes memory 402, which may represent the volatile memory 322 and/or the non-volatile memory 324. The memory 402 stores a device application 404. In various embodiments, the device application 404 may configure a processor(s) 450 (which may represent or be similar to the processor(s) 310 of FIG. 3) to capture first image data 406 using a camera 452 (which may represent or be similar to the camera 314 of FIG. 3), first audio data 408 using microphone(s) 458 (which may represent or be similar to the microphone(s) 328 of FIG. 3), input data 410 using a button 462 (which may represent or be similar to the button 306 of FIG. 3) (and/or the camera 452 and/or a motion sensor(s) 454, depending on the embodiment), and/or first motion data 412 using the camera 452 and/or the motion sensor(s) 454. In some embodiments, the device application 404 may also configure the processor(s) 450 to generate first text data 414 describing the first image data 406, the first audio data 408, and/or input data 410, such as in the form of metadata, for example.

In addition, the device application 404 may configure the processor(s) 450 to transmit the first image data 406, the first audio data 408, the first motion data 412, the input data 410, the first text data 414, and/or message(s) 416 to the first client devices 214, 216, the hub device 202, and/or the server 224 using a communication module 456 (which may represent or be similar to the communication module 312 of FIG. 3). In various embodiments, the device application 404 may also configure the processor(s) 450 to generate and transmit an output signal 418 that may include the first image data 406, the first audio data 408, the first text data 414, the input data 410, and/or the first motion data 412. In some of the present embodiments, the output signal 418 may be transmitted to the server(s) 224 using the communication module 456. The server(s) 224 may then transmit (or forward) the output signal 418 to the first client device(s) 214, 216, and/or the hub device 202 may then transmit (or forward) the output signal 418 to the first client device(s) 214, 216, and/or the hub device 202 may then transmit (or forward) the output signal 418 to the server(s) 224, and the server(s) 224 may then transmit (or forward) the output signal 418 to the first client device(s) 214, 216. In other embodiments, the output signal 418 may be transmitted directly to the first client device(s) 214, 216 by the first A/V device 210. In some embodiments, the first client devices 214, 216 may receive the first image data 406, the first audio data 408, and/or the first text data 414. In some embodiments, the first client devices 214, 216 may generate and transmit a share signal 420 to the server(s) 224, wherein the share signal 420 includes a command to share the first image data 406, the first audio data 408, and/or the first text data 414 with a network of users, as described above. In some embodiments, the device application 404 may configure the processor 450 to directly generate and transmit the share signal 420 to the server(s) 224 using the communication module 456. In many embodiments, the server(s) 224 may use the output signal 418 including the first image data 406, first audio data 408, and/or first text data 414 in generating a neighborhood map, as further described below.

In further reference to FIG. 4, the first image data 406 may comprise image sensor data such as (but not limited to) exposure values and data regarding pixel values for a particular sized grid. The first image data 406 may include still images, live video, and/or pre-recorded images and/or video. The first image data 406 may be recorded by the camera 452 in a field of view of the camera 452. In addition, the first motion data 412 may comprise motion sensor data generated in response to motion events. For example, the first motion data 412 may include an amount or level of a data type generated by the motion sensor(s) 454 (e.g., the voltage level output by the motion sensor(s) 454 when the motion sensor(s) 454 are pyroelectric passive infrared (PIR) type motion sensor(s)). In some of the present embodiments, such as those where the first A/V device 210 does not include the motion sensor(s) 454, the first motion data 412 may be generated by the camera 452. In such embodiments, based on a frame-by-frame comparison of changes in the pixels from the first image data 406, it may be determined that motion is present. Further, the input data 410 may include data generated in response to an input to the button 462. The button 462 may receive an input (e.g., a press, a touch, a series of touches and/or presses, etc.) and may generate the input data 410 in response that is indicative of the type of input. In embodiments where the first A/V device 210 is not a doorbell (e.g., the video doorbell 210(*c*)), the first A/V device 210 may not include the button 462 and the first A/V device 210 may not generate the input data 410.

With further reference to FIG. 4, the first A/V device 210 may generate a message 416 using the processor(s) 450 and transmit the message 416, using the communication module 456, to the first client device(s) 214, 216, the hub device 202, and/or the server(s) 224. For example, in response to detecting motion using the camera 452 and/or the motion sensor(s) 454, the first A/V device 210 may generate and transmit the message 416. In some of the present embodiments, the message 416 may include at least the first image data 406, the first audio data 408, the first text data 414, and/or the first motion data 412. As described herein, the message 416 may include messages, signals, data, notifications, and/or any type of electronic communication that electronic devices (e.g., the first A/V device 210, the first client device(s) 214, 216, the second client device(s) 215, 217, the hub device 202, and/or one or more components of the network(s) of servers/backend devices 220) may transmit and receive with other electronic devices (e.g., the first A/V device 210, the first client device(s) 214, 216, the second client device(s) 215, 217, the hub device 202, and/or one or more components of the network(s) of servers/backend devices 220). For instance, message 416 may include push notifications, email messages, short message service (SMS) messages, multimedia messages (MMS), voicemail messages, video signals, audio signals, data transmissions, and/or any other type of electronic communication that an electronic device can send to another electronic device.

The first image data 406, the first audio data 408, the first text data 414, and/or the first motion data 412 may be tagged with (e.g., a time stamp, based on clock data) and/or stored separately (e.g., on the server(s) 224, the hub device 202, and/or the first A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with first image data 406, first audio data 408, first text data 414, and/or first motion data 412 representative of the detection of motion, or motion event. As a result, when a request for data pertaining to particular motion event, or a particular time period, is received (e.g., by the first client device(s) 214, 216, the server(s) 224, and/or the hub device 202), the first image data 406, the first audio data 408, the first text data 414, and/or the first motion data 412 associated with a particular motion event, and/or associated with motion event(s) within the particular time period, may be transmitted, retrieved, and/or received.

Although examples discuss the first A/V device 210 generating and transmitting the first image data 406, the first audio data 408, the first text data 414, and/or the first motion data 412 when motion is detected (e.g., in the message 416), in other examples the data may be generated and/or transmitted at other times. For example, the first image data 406, the first audio data 408, the first text data 414, and/or the first motion data 412 may be generated and transmitted continuously (e.g., in a streaming manner), periodically, upon request, etc. In examples where the first image data 406, the first audio data 408, the first text data 414, and/or the first motion data 412 may be generated and transmitted continuously, the detection of motion (e.g., a motion event) may cause an indication of when the motion was detected (e.g., a time stamp) and/or how long the motion was detected for (e.g., a duration) to be associated with the first image data 406, the first audio data 408, the first text data 414, and/or the first motion data 412. As a result, even though the first image data 406, the first audio data 408, the first text data 414, and/or the first motion data 412 may be continuously generated by the first A/V device 210, the first image data 406, the first audio data 408, the first text data 414, and/or the first motion data 412 associated with motion events may be tagged and/or stored separately (e.g., similar to that of the first image data 406, the first audio data 408, the first text data 414, and/or the first motion data 412 generated in response to the detection of motion), from the first image data 406, the first audio data 408, the first text data 414, and/or the first motion data 412 that is not associated with motion events.

Figure 5:
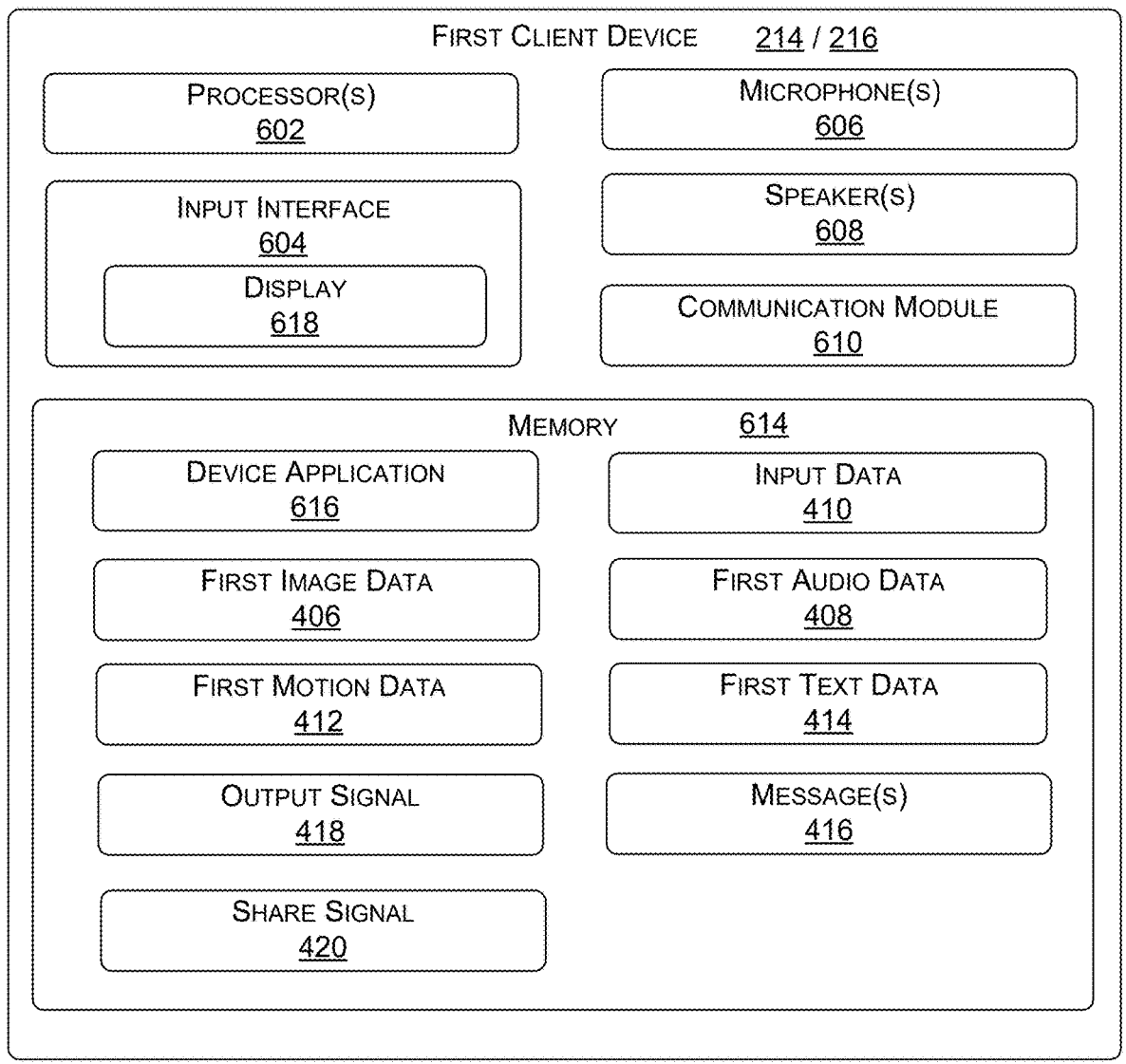
FIG. 5 is a functional block diagram illustrating one example embodiment of a first client device according to various aspects of the present disclosure.

FIG. 5 is a functional block diagram illustrating one embodiment of the first client device(s) 214, 216, according to various aspects of the present disclosure. As described above, the first client device(s) 214, 216 may be configured to share video footage captured by the first A/V devices 210 using a share signal 420. The first client device(s) 214, 216 may comprise processor(s) 602 that are operatively connected to an input interface 604, one or more microphone(s) 606, a speaker(s) 608, a communication module 610, and a memory 614. The first client device(s) 214, 216 may further comprise a camera (not shown) operatively connected to the processor(s) 602.

The memory 614 may store a device application 616. In various embodiments, the device application 616 may configure the processor(s) 602 to receive input(s) to the input interface 604. In addition, the device application 616 may configure the processor(s) 602 to receive, using the communication module 610, the first image data 406, the first audio data 408, the input data 410, the first motion data 412, the first text data 414, message(s) 416, and/or the output signal 418, from one or more of the first A/V device(s) 210 or the server(s) 224. In some embodiments, the first client devices 214, 216 may be configured to transmit the first image data 406, the first audio data 408, the input data 410, the first motion data 412, the first text data 414, message(s) 416, and/or the output signal 418, from the first A/V devices 210 to the server(s) 224 for generating and transmitting a neighborhood alert signal to at least one user of the network, as further described below. In other embodiments, the first image data 406, the first audio data 408, the input data 410, the first motion data 412, the first text data 414, message(s) 416, and/or the output signal 418 may be transmitted directly from the first A/V devices 210 to the server(s) 224. In various embodiments, the first client device(s) 214, 216 may transmit the share signal 420 to the server(s) 224, where the server(s) 224 may then generate and transmit the neighborhood alert signal to at least one user of the network of users, as further described below.

With further reference to FIG. 5, the input interface 604 may include a display 618. The display 618 may include a touchscreen, such that the first user of the first client device(s) 214, 216 may provide inputs directly to the display 618. For example, the first user may be presented with a prompt on the display 618 to share first image data 406 captured by the first A/V devices 210. In such embodiments, upon receiving the first user's input to share the first image data 406 (and/or the first audio data 408 and/or first text data 414), the processor 602 may generate the share signal 420. In some embodiments, the first client device(s) 214, 216 may not include a touchscreen. In such embodiments, and in embodiments where the first client device(s) 214, 216 includes the touchscreen, the first user may provide an input using any input device, such as, without limitation, a mouse, a trackball, a touchpad, a joystick, a pointing stick, a stylus, etc.

In some of the present embodiments, in response to receiving a message 416, the device application 616 may configure the processor(s) 602 to cause the display 618 to display the message 416. The message 416 may indicate that the first A/V device 210 detected motion, detected the presence of an object, received an input (e.g., to the button 462), etc. While displaying the message 416, the input interface 604 may receive input from the first user to answer the message 416. In response, the device application 614 may configure the processor(s) 602 to display the received first image data 406 on the display 618 (e.g., display image(s) and/or video footage represented by the first image data 406).

Figure 6:
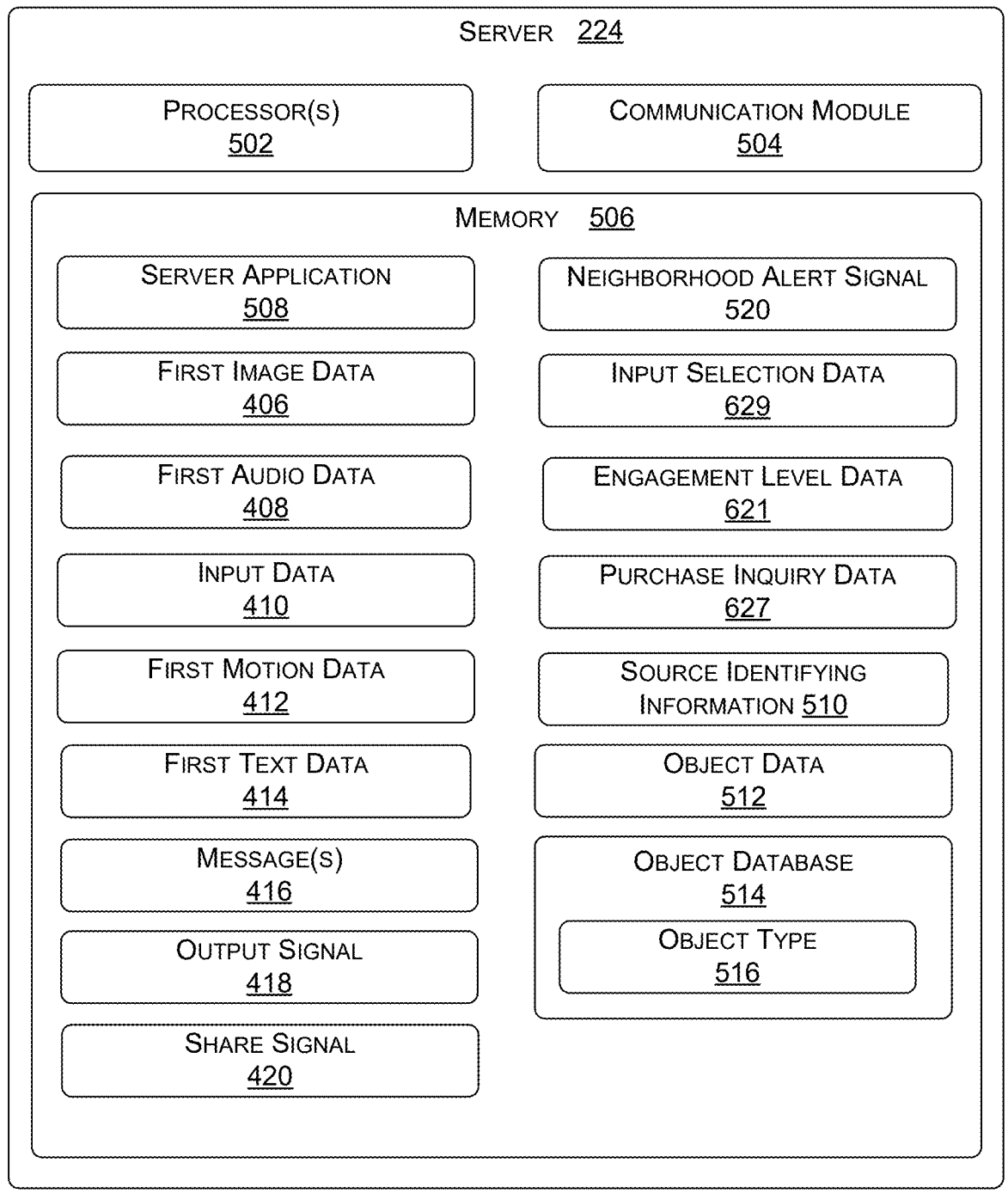
FIG. 6 is a functional block diagram illustrating one example embodiment of a backend device according to various aspects of the present disclosure.

FIG. 6 is a functional block diagram illustrating one embodiment of the server(s) 224 according to various aspects of the present disclosure. The server(s) 224 may comprise at least one processor(s) 502, a communication module 504, and a memory 506. The communication module 504 may allow the server(s) 224 to access and communicate with devices connected to the network (Internet/PSTN) 212 (e.g., the first A/V devices 210, the hub device 202, the first client devices 214, 216, the second client devices 215, 217, the web server(s) 252, and/or a device controlled by the security monitoring service 228). In various embodiments, each network device may be associated with a particular location. For example, the first A/V devices 210 may be associated with a first location and the second client devices 215, 217 may be associated with a second location. In many embodiments, the server application 508 may further configure the processor(s) 502 to determine a model identifier associated with the first A/V device 210 and generate and transmit a neighborhood alert signal 520 to at least one user of the network of users using a client device (e.g., the second user using the second client devices 215, 217). In many embodiments, the neighborhood alert signal 520 may include the first image data 406 and the model identifier associated with the first A/V device 210, and the second user may purchase one or more A/V devices corresponding to the model identifier, as further described below.

With reference to FIG. 6, the server application 508 may configure the processor(s) 502 to receive and/or retrieve the first image data 406, the first audio data 408, the first text data 414, and/or the first motion data 412 from the first A/V device 210 (e.g., in the output signal 418) using the communication module 504. In some embodiments, the server application 508 may also configure the processor(s) 502 to also receive and/or retrieve the input data 410 and/or the messages 416 from the first A/V device 210 (e.g., in the output signal 418). As described above, the first image data 406 may be captured using a camera 452 and the first audio data 408 may be captured using the microphone(s) 458 of the first A/V device 210, wherein the first A/V device 210 may be associated with a model identifier. Further, the server application 508 may configure the processor(s) 502 to receive, from the first client device(s) 214, 216, a share signal 420 that includes a command to share the first image data 406, first audio data 408, and/or first text data 414, with a network of users, as further described below. Further, the server application 508 may configure the processor(s) 502 to determine the model identifier associated with the first A/V device 210 and generate the neighborhood alert signal 520 using the first image data 406 and the model identifier associated with the first A/V device 210, as further described below.

In further reference to FIG. 6, the memory 506 may also include source identifying data 510 that may be used to identify the first A/V device 210, the hub device 202, the first client devices 215, 217, and/or the second client devices 214, 216. In some embodiments, the source identifying data 510 may include the model identifier associated with the first A/V device 210. In some embodiments, the source identifying data 510 may be used to determine the model identifier associated the first A/V device 210. For example, the source identifying data 510 may identify a first user associated with the first A/V device 210 and the server(s) 224 may look up the model identifier associated with the first A/V device 210 based on the identity of the first user. In some embodiments, the model identifier associated with the first A/V device 210 may be identified using any data received from the first A/V device 210, as further described below. Further, the source identification data 510 may be used to determine relative locations of various devices such as, but not limited, the first location associated with the first A/V device 210 and the second location associated with the second client devices 215, 217. In addition, the source identification data 510 may be used to determine whether an A/V device is a predefined distance from another A/V device to receive share notifications, as further described below. In addition, the source identifying data 510 may be used by the processor(s) 502 of the server(s) 224 to determine the first client devices 214, 216 are associated with the first A/V device 210 and/or the hub device 202.

The server application 508 may also configure the processor(s) 502 to transmit (and/or forward) the first image data 406, the first audio data 408, the first text data 414, the first input data 410, the first messages 416, and/or the first motion data 412 to the first client devices 214, 216 using the communication module 504. In some embodiments, the server application 508 may further configure the processor(s) 502 to generate and transmit a report signal (not shown) to the third-party client device(s). The report signal, which may be the message 416, in some examples, may include the first image data 406, the first audio data 408, and/or the first text data 414.

In further reference to FIG. 6, the server application 508 may configure the processor(s) 502 to provide at least one hyperlink to a website that includes information about A/V devices corresponding to the model identifier. In some embodiments, the server application 508 may configure the processor(s) 502 to transmit the hyperlink to the second client device(s) 215, 217 using the communication module 504. For example, the server(s) 224 may include the hyperlink in the neighborhood alert signal 520 that is transmitted to the second client device(s) 215, 217, as described above. In other embodiments, where the hyperlink is not provided by the server(s) 244, the second client device(s) 215, 217 may generate the hyperlink upon receiving the neighborhood alert signal 520. In still other embodiments, the web server(s) 252 may provide the hyperlink to the website that includes information about the A/V devices corresponding to the model identifier. In various embodiments, the website may facilitate purchasing a second A/V device corresponding to the model identifier, as further described below. For example, the server(s) 224 may receive from the second client devices 215, 217 input selection data 629 indicating that the second user has selected the hyperlink to the website and/or purchase inquiry data 627 indicating that the second user is seeking to purchase the second A/V device corresponding to the model identifier. In various embodiments, the server(s) 224 may determine a discount amount for purchasing the second A/V device corresponding to the model identifier. In some embodiments, the discount amount may be based on at least engagement with the first image data 406 by the at least one user (e.g., the second user) of the network of users. For example, the server(s) 224 may receive from the second client devices 215, 217 engagement level data 621 that indicates the second user's level or extent of engagement with the first image data 406, as further described below. In some embodiments, the discount amount may be based other factors, as described below.

In further reference to FIG. 6, the discount amount may be determined based on at least the first image data. For example, the discount amount may be greater when the first image data includes image data representative of images depicting a crime and/or includes images of a weapon, as further described below. The server application 508 may configure the processor(s) 502 to identify various parameters such as, but not limited to, identification of a particular person, an object, and/or an event. For example, the server(s) 224 may identify an object (e.g., weapon(s)), event (e.g., break-in, fire, parcel theft), and/or person (e.g., suspicious person, felon, etc.) in the first image data 406 recorded by the first A/V device 210. For example, the server application 508 may configure the processor(s) 502 to analyze the first image data 406 in order to determine if the first image data 406 represents an object. Objects may include, but are not limited to, people, animals, vehicles, parcels (e.g., packages), electronic devices (e.g., remote control vehicles, drones, etc.), and/or any other type of object that can be depicted by the images that the first image data 406 represents. Objects may further include anything that causes motion that can be detected by the first A/V device 210. In some examples, the processor(s) 502 of the server(s) 224 may analyze the first image data 406 whenever the server(s) 224 receives the first image data 406 from the first A/V device 210.

In some examples, to analyze the first image data 406 computer vision processing and/or image processing, as described herein, for example, may be performed by the processor(s) 502 of the server(s) 224 to determine that the first image data 406 represents images depicting one or more objects. For example, in any of the present embodiments, the first image data 406 may be analyzed to determine object data 512. In some of the present embodiments, one or more of the first image data 406, the first motion data 412, and the first audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the server(s) 224 may compare the object data 512 to an object database 514 to determine what, if any, object(s) are depicted in the images that the first image data 406 represents. For example, the object database 514 may store image data corresponding to images and/or video footage that depicts various objects, where the image data may be labeled (e.g., tagged, such as in the form of metadata) to indicate an object type 516 (alternatively referred to herein as the "type of object 516") depicted by each image and/or video footage. For a first example, the object database 514 may store image data representing an image depicting a person, where the image data is labeled to indicate that the type of object 516 includes a person. For a second example, the object database 514 may store image data representing an image depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data representing an image depicting a vehicle, where the image data is labeled to indicate the type of object 516 includes the vehicle.

Based on the comparing, the processor(s) 502 of the server(s) 224 may match the object data 512 from the first image data 406 to the image data stored in the object database 514. The processor(s) 502 of the server(s) 224 may then use the match to determine that the object data 512 represents an object and/or to determine the type of object 516 that the object data 512 represents. For example, if the processor(s) 502 of the server(s) 224 matches the object data 512 from the first image data 406 to image data stored in the object database 514 that represents a person, then the processor(s) 502 of the server(s) 224 may determine that the first image data 406 represents an image depicting a person. In some examples, when the object data 512 represents multiple objects, the processor(s) 502 of the server(s) 224 may perform a similar analysis to identify each object represented by the object data 512 and/or the respective type of object 516 associated with each of the objects represented by the object data 512.

In some examples, in addition to, or alternatively from, comparing the first image data 406 to the image data stored in the object database 514, features and/or characteristics of various objects may be stored in the object database 514, and the features and/or characteristics of the objects in the first image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted in an image represented by the first image data 406 may then be compared to the sizes, volumes, weights, colors, movement types, and/or other features and/or characteristics stored in the object database 514 to identify the type of object 516 depicted in an image represented by the first image data 406.

Although described as being performed at the server(s) 224, in some embodiments, the first image data 406 may be analyzed by any of the first A/V device 210, the hub device 202, and/or the first client device(s) 214, 216, in order to determine if the first image data 406 represents an image depicting an object therein. Thus, any or all of the operations described herein to analyze the first image data 406 may be performed by any of these devices. To perform these operations, any or all of these devices may also include the object database 514, including the object type 516, and/or the object data 514, as described with reference to FIG. 6. Although referred to as the server(s) 224 with reference to the processes described herein, the server(s) 224 may additionally, or alternatively, include one or more of the devices from the network(s) of servers/backend devices 220. For example, the processes described herein with respect to the server(s) 224 may additionally, or alternatively, at least in part, be performed by one or more APIs 226. Further, the processes described herein with respect to the server(s) 224 may additionally, or alternatively, be performed by the web server(s) 252. In some embodiments, the web server(s) 252 may perform any or all processes including, but not limited to, facilitating the purchase of A/V devices corresponding to the model identifier. For example, the web server(s) 252 may provide the website after the second user selects the hyperlink to the website and/or receive payment from the second user to purchase the second A/V device. Further, the web server(s) 252 may determine and apply the discount amount, as described herein.

Figure 7:
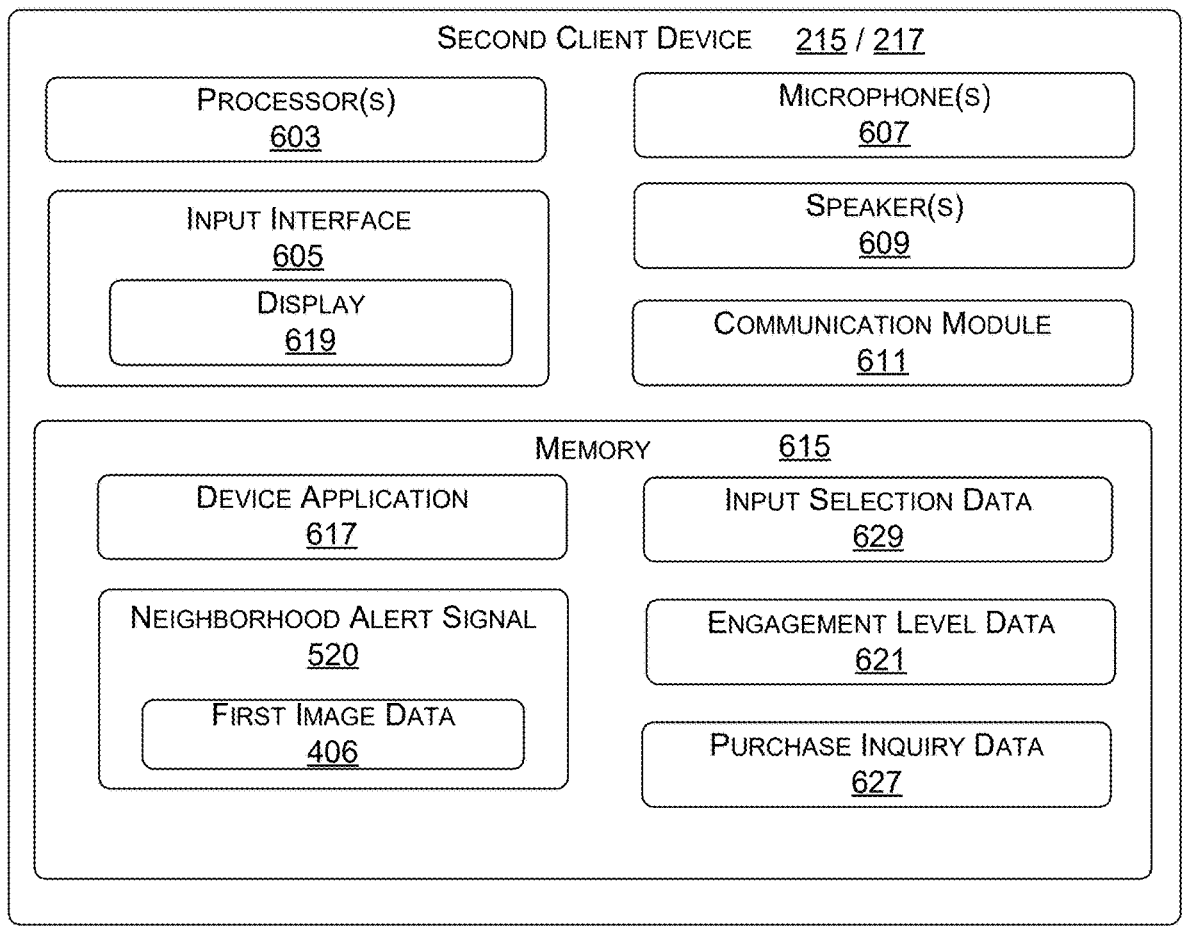
FIG. 7 is a functional block diagram illustrating one example embodiment of a second client device according to various aspects of the present disclosure.

FIG. 7 is a functional block diagram illustrating one embodiment of the second client device(s) 215, 217, according to various aspects of the present disclosure. The second client device(s) 215, 217 may comprise processor(s) 603 that are operatively connected to an input interface 605, one or more microphone(s) 607, a speaker(s) 609, a communication module 611, and a memory 615 storing a device application 617. The second client device(s) 215, 217 may further comprise a camera (not shown) operatively connected to the processor(s) 603. As described above, the second client device(s) 215, 217 may be configured to receive from the server(s) 224 a neighborhood alert signal 520 that may include first image data 406 captured by a camera 452 of the first A/V device 210 and a model identifier associated with the first A/V device 210.

With reference to FIG. 7, the device application 617 may configure the processor(s) 603 to receive input(s) to the input interface 605, where the input interface 605 may include a display 619. The display 619 may include a touchscreen, such that the first user of the second client device(s) 215, 217 may provide inputs directly to the display 619. In some embodiments, the second client device(s) 215, 217 may not include a touchscreen. In such embodiments, and in embodiments where the second client device(s) 215, 217 includes the touchscreen, the first user may provide an input using any input device, such as, without limitation, a mouse, a trackball, a touchpad, a joystick, a pointing stick, a stylus, etc. As further described below, the device application 617 may configure the processor(s) 503 to display the first image data 406, the model identifier associated with the first A/V device 210, and/or a hyperlink to a website that provides information about the A/V device(s) corresponding to the model identifier. Further, the second client devices 215, 217 may receive an input selection of the hyperlink that may be stored in the memory 615 as input selection data 629 and transmitted to the server(s) 224 (and/or the web server(s) 252). In response to the input selection of the hyperlink, the second client device 215, 217 may display the website having information about the A/V device(s) corresponding to the model identifier and facilitate purchasing a second A/V device corresponding to the model identifier, as further described below.

With further reference to FIG. 7, the device application 617 may configure the processor(s) 503 to track and/or determine a level or extent of engagement by the second user with the first image data 406, and information about the second user's engagement with the first image data 406 may be stored in the memory 615 as engagement level data 621. In various embodiments, the engagement level data 621 may be transmitted to the server(s) 224 (and/or the web server(s) 252) and may be used by the server(s) 224 (and/or the web server(s) 252), as further described below. In various embodiments, the engagement level data 621 may reflect a level of user engagement based on whether the second user has commented on the first image data 406, shared the first image data 406 with at least one additional user of the network of users, viewed the first image data 406 beyond a predetermined length of time, provided positive (or negative) affirmation regarding the first image data 406, hovered a pointer over the first image data 406 beyond a predetermined length of time, scrolled past the first image data 406 and then returned to the first image data 406, etc. As further described below, the engagement level data 621 may be used by the server(s) 224 (and/or the web server(s) 252) to determine a discount amount for purchasing a second A/V device corresponding to the model identifier. In some embodiments, the second user may purchase the second A/V device by transmitting purchase inquiry data 627 to the server(s) 224 and/or the web server(s) 252, as further described below.

Figure 8:
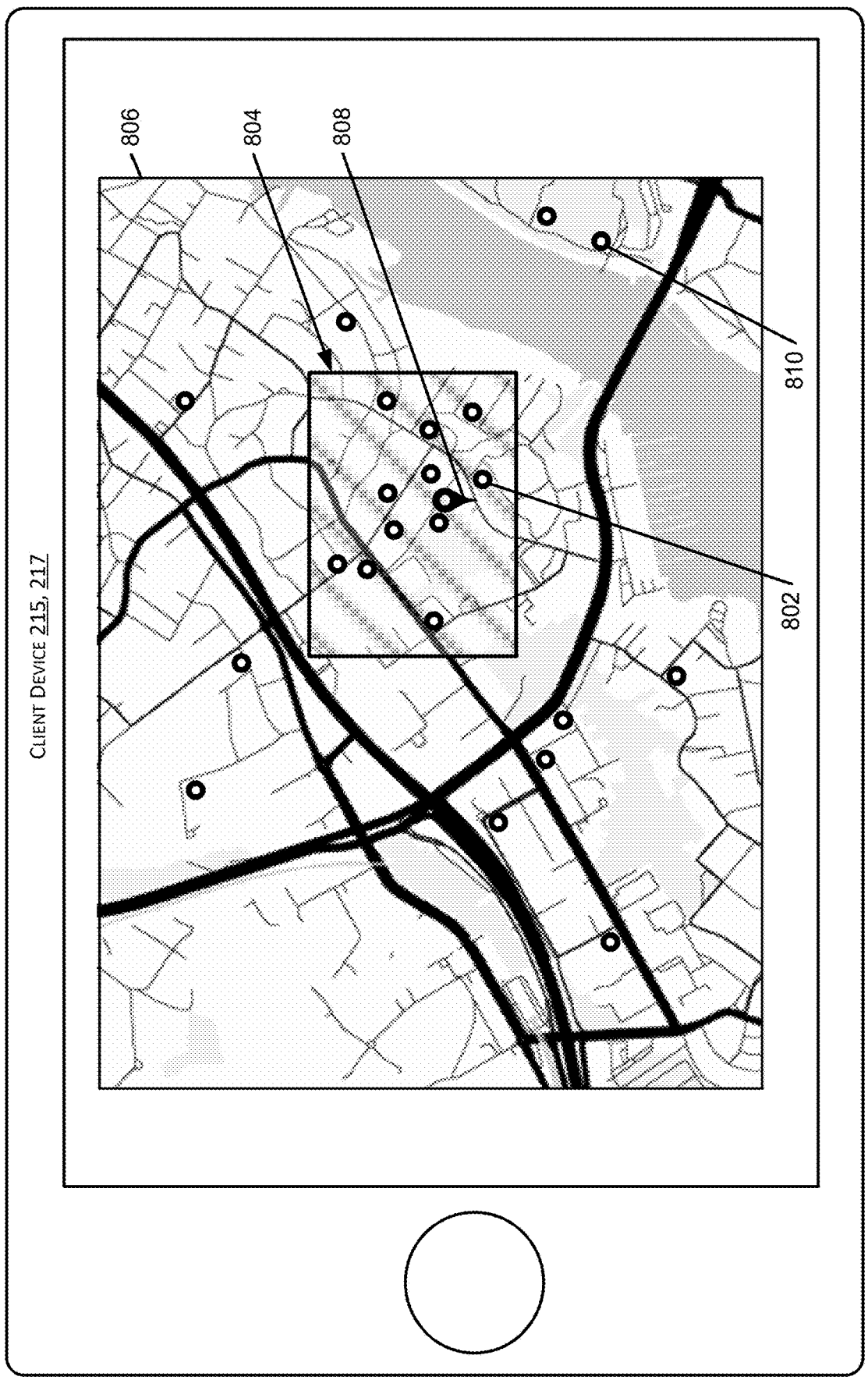
FIG. 8 is a schematic diagram illustrating an example of a geographic network according to various aspects of the present disclosure.

FIG. 8 is a schematic diagram illustrating an example of a geographic network of users, according to various aspects of the present disclosure. In some examples, a geographic network may be executed by a geographic network platform, such as a geographic network platform operating on the server(s) 224 and/or one or more other or additional components of the network of servers/backend devices 220. As such, the server(s) 224 and/or one or more other or additional components of the network of servers/backend devices 220 may store and/or maintain the components, features, and/or functionality of the geographic network platform. In some examples, and without limitation, the geographic network may be a neighborhood-oriented or local-oriented network, such as Neighborhoods or Nextdoor. In other examples, and without limitation, the geographic network may be a social media network (or a feature within a social media network), such as Facebook, Twitter, or Instagram.

The geographic network platform may enable users of the geographic network to share content (e.g., the neighborhood alert signal 520, image data (e.g., the first image data 406), audio data (e.g., the first audio data 408), text data (e.g., the first text data 414), input data (e.g., the input data 410), motion data (e.g., the first motion data 412), and/or other data from the user's A/V device (e.g., the first A/V device 210) and/or the user's client device (e.g., the first client device(s) 214, 216, the second client device(s) 215, 216)) with other users of the geographic network. The geographic network platform may allow users that are located within geographic area(s) to register with the geographic network to access content shared by other users within the geographic area(s). As such, the content that a particular user may have access to may be based on the user's location (e.g., the location of the user's residence, the location of one or more A/V devices associated with the user, the current location of the user (e.g., based on a location of the user's client device), etc.) and/or the location of the electronic device(s) (e.g., the first A/V device 210, the first client device(s) 214, 216, or the second client device(s) 215, 217, etc.) that generated the content. For example, users that are located in a geographic area may share content with other users in the geographic area and/or in a similar geographic area, and/or users may view content shared by other users that are located within his or her geographic area (e.g., a neighborhood, a town, a city, a state, a user-defined area, etc.) and/or in a similar geographic area. In some examples, a user may register with the geographic network platform if the user has an A/V device and/or has an application (e.g., a mobile application, a web application, etc.) associated with the geographic network installed on and/or running on his or her client device. When registering for the geographic network, the user may register, or be required to register, with respect to a geographic area. In some examples, a user may register with the geographic area of the geographic network if the user's residence is located within the geographic area and/or the user has A/V device(s) located (e.g., installed) within the geographic area. In some examples, a user may be a member to one or more geographic areas of the geographic network.

In some examples, a user may be verified to a geographic area of the geographic network that the user is requesting to join. For example, to determine if the user is actually located within a geographic area, GNSS data of the user's A/V device may be used (e.g., during and/or after installation, provisioning, and/or setup of the A/V device). As another example, to determine if the user is actually located within a geographic area, GNSS data of the user's client device may be compared (e.g., over a period time) to an address input by the user. For example, if the user inputs an address, and the location of the user's client device is within a threshold proximity to the address (e.g., over the period of time, which may be, for example and without limitation, four hours, six hours, twenty-four hours, two days, etc.), the user may be verified to the address, and thus verified to the geographic area of the geographic network. A verified user may have full access to features of the geographic network, and/or full access to content shared by other users of the geographic network in the geographic area that the user is verified for. Non-verified users may have limited access to features and/or content of the geographic network. For example, non-verified users may only be able to view content, but not interact with (e.g., comment on, like, share, etc.) the content, and/or may not be able to share his or her own content. A single user may be a verified user of one geographic area of the geographic network and may be a non-verified user of a second geographic area of the geographic network.

In some examples, a provider of the geographic network platform (e.g., hosted on the server(s) 224) may receive shared content from any user that is associated with the provider and/or the geographic network, but each individual user may only share content with and/or view content shared from other users within a geographic area of the user. As a result, content provided to and/or made available to each user by the geographic network platform may be unique to each user (e.g., based on the unique location of the user's residence and/or the user's A/V devices, etc.), and/or unique to a geographic area (e.g., all users associated with a geographic area of the geographic network).

In one illustration of a geographic network, the geographic network platform may facilitate a content feed (may also be referred to as "neighborhood alert feed") to allow a user of the geographic network to post videos, photos, text, and/or other data (e.g., neighborhood alert signal 520) to alert other members of possible suspicious activity in a geographic area. Additionally, or alternatively, news items, police sourced information, and/or other third-party data may be posted to the content feed of the geographic network (e.g., by the users and/or by the provider of the geographic network (e.g., the host of the geographic network platform)), that are related to crime and/or safety of the geographic area (e.g., restricting news items to those related to the geographic area). Members of the geographic network may rate, like, dislike, comment, download, share an existing post/alert with others, and/or upload a new post/alert to the content feed to provide additional information for other users.

A geographic area of a geographic network may be defined using various methods. For example, a geographic area may be associated with one or more neighborhoods, towns, zip codes, cities, states, or countries. In another example, a geographic area may be determined by the server(s) 224 based on grouping a particular number of A/V devices or client devices about a particular vicinity. In a further example, a user may customize a geographic area (e.g., by drawing the geographic area on a map, by providing a radius from the user's property for which the user would like to view shared content, by positioning a boundary (e.g., using markers to define a polygon) of the geographic area over a map, etc.). In such an example, the user's geographic area may be unique to the user.

In some embodiments, a client device may be configured to receive shared content such as, but not limited to, a neighborhood alert signal 520 based on output signal(s) generated by users within the same geographical area(s) and/or geographical network(s). For example, the second client device(s) 215, 217, associated with the second user, may receive the neighborhood alert signal 520 based on information from the first A/V device 210 (e.g., first image data 406, first audio data 408, first text data 414, first motion data 412, etc.) if the first user associated with the first A/V device 210 and/or the first A/V device 210 is within the same geographical area(s) and/or geographical network as the second user and/or the second client devices 215, 217.

For example, and as illustrated in FIG. 8, a portion of the geographic network is shown. With reference to FIG. 8, and during a setup or registration process with the geographic network, the location 808 (may also be referred to as "second location") to be associated with the second user of the second client device(s) 215, 217 may be determined (e.g., based on an address being input by the second user, based on a determination of the location of the second client device(s) 215, 217, based on the location of A/V device(s) associated with the second user (in examples where the second user has one or more A/V devices), etc.). Likewise, the location 802 (may also be referred to as "first location") to be associated with the first user may be determined (e.g., based on an address input by the first user, based on a determination of the location of the first client device(s) 214, 216, based on the location of the first A/V device(s) 210 associated with the first user (in examples where the first user has one or more first A/V devices 210), etc.).

In some examples, the second user may then be associated with the geographic area 804 of the geographic network, such as based on the neighborhood, town, city, zip code, state, country, or other area in which the user is located. In one example, the geographic area 804 may be the town where the second location 808 associated with the second user is located. In other examples, the second user may define, on the map 806, the geographic area 804 of the geographic network where the second user wishes to have access to content and/or wishes to receive share data (e.g., first image data 406 and/or neighborhood map 518) regarding, which may include the second location 808 associated with the second user. In some embodiments, the geographical area 804 may be the second user's regional location that the server(s) 224 may use in determining neighborhood map(s) to transmit to the second client device(s) 215, 217 associated with the second user. In some embodiments, to define the geographic area 804, the second user may overlay a predefined shape on the map 806 (e.g., a rectangle, as shown, a circle, a triangle, a square, a polygon, etc.), may position any number of vertices to define a polygon on the map 806, may define a radius about the second location 808 associated with the second user, may draw the geographic area 804 on the map, etc. The geographic network may limit the size of the geographic area 804 for the second user. The size may be limited to a maximum distance in any direction from the second location 808 (e.g., a radius) associated with the second user of less than, for example and without limitation, two miles, five miles, ten miles, fifteen miles, fifty miles, or any other distance.

With further reference to FIG. 8, and during use of the geographic network platform by the second user of the second client device(s) 215, 217, the second user may access a GUI on the second client device(s) 215, 217 (e.g., within a mobile or web application). In some embodiments, the second user may indicate a predefined distance from the second location 808 within which the second user desires to receive share information including, but not limited to, neighborhood map(s) 518. For example, the second user may configure the second client device(s) 215, 217 to receive shared information from A/V devices (e.g., first A/V device 210) located within the predefined distance (e.g., the first location 802 associated with the first user). Thus, an A/V device located at 810, which may be outside of the predefined distance from the second user's location 808, may not result in the second client device(s) 215, 217 receiving shared information from a user associated with the A/V device located at 810.

Each of the processes described herein, including the processes 900, 1000, and 1100, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

FIG. 9 is a flowchart illustrating an example process 900 for generating and transmitting a neighborhood alert signal 520 that includes a model identifier of a first A/V device 210 according to various aspects of the present disclosure. In many embodiments, a backend device (e.g., the server(s) 224) may be configured to perform the process 900 for generating and transmitting the neighborhood alert signal 520 to at least one user (e.g., a second user) of a network of users. Although described below using the server(s) 224 as performing the process 900, in other embodiments, any of the network devices, including, but not limited to, the web server(s) 252, alone or in combination, may be configured to perform the process 900 as appropriate to the requirements of a specific application in accordance with embodiments of the present disclosure.

In reference to FIG. 9, the process 900 may include receiving (block B902), from a first A/V device 210, at the server(s) 224 in network communication with the first A/V device 210, first image data 406 captured by a camera 452 of the first A/V device 210, as described above. The camera 452 of the first A/V device 210 may include a first field of view and the first A/V device 210 may be associated with a model identifier. In some embodiments, the first image data 406 may be received (block B902) as part of an output signal 418 from the first A/V device 210. Further, in some embodiments, the output signal 418 (received by the server(s) 224) may also include various data, such as, but not limited to, first audio data 408, first text data 414, first motion data 412, input data 410, and/or other data that may be captured and/or generated by the first A/V device 210. The process 900 may also include receiving (block B904), from a first client device(s) 214, 216 associated with the first A/V device 210, a share signal 420 including a command to share the first image data 406 with a network of users. As described above, the network of users may include various users and non-users of A/V devices. Further, the server(s) 224 may be configured to determine which users should receive shared data (e.g., the neighborhood alert signal 520) based on the location of the user (e.g., second user), the user's A/V device(s), and/or the user's client device (e.g., the second client device(s) 215, 217).

In further reference to FIG. 9, the process 900 may include determining (block B906) a model identifier associated with the first A/V device 210. For example, the model identifier associated with the first A/V device 210 may be a make, model, serial number, product version, and/or any other identifier that identifies a particular product classification of the first A/V device 210. As described above, in some embodiments, a source identifying data 510, received at the server(s) 224 from the first A/V device 210, may include the model identifier associated with the first A/V device 210. In some embodiments, the source identifying data 510 may include a first user associated with the first A/V device 210 and the server(s) 224 may look up the model identifier associated with the first A/V device 210 based on the identity of the first user. In some embodiments, the formatting, quality, and/or other any other property associated with any data received from the first A/V device 210, may be used to determine the model identifier associated with the first A/V device 210. For example, the formatting and/or data type associated with the first image data 406, first audio data 408, and/or first motion data 412 may be used to determine the model identifier associated with the first A/V device 210.

With further reference to FIG. 9, the process 900 may further include generating (block B908) a neighborhood alert signal 520 that includes the first image data 406 and the model identifier associated with the first A/V device 210. The process 900 may also include transmitting (block B910) the neighborhood alert signal 520 to at least one user of the network of users. For example, transmitting (block B910) the neighborhood alert signal 520 to at least one user may include transmitting the neighborhood alert signal 520 to a client device (e.g., the second client devices 215, 217) associated with the at least one user (e.g., the second user). In various embodiments, the at least one user of the network of users (e.g., the second user) may be selected as described above. The neighborhood alert signal 520, in some embodiments, may comprise a push notification sent to the client device. Alternatively, or in addition, the neighborhood alert signal 520 may comprise an update signal sent to an application (e.g., the device application 617) executing on the client device. For example, when the user opens the application on the client device, the application may download updated alert information from a server (e.g., the server(s) 224 and/or the web server(s) 252), and the updated alert information may be displayed on a display screen of the client device. In some embodiments, the process 900 may forgo generating (block B908) the neighborhood alert signal 520, and may instead proceed directly with transmitting the first image data 406 and the model identifier associated with the first A/V device 210 to the at least one user of the network of users, as described above.

Figure 10:
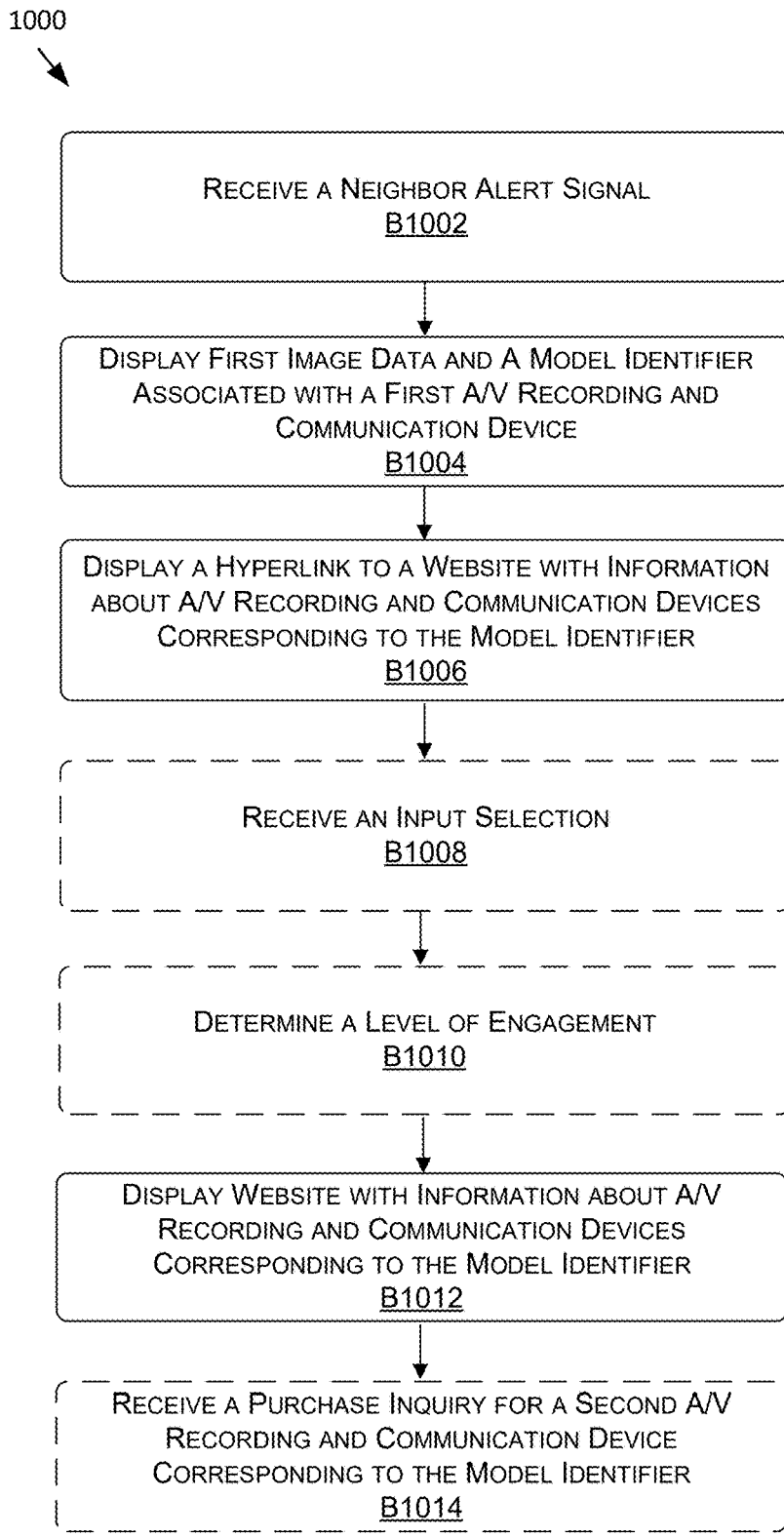
FIG. 10 is a flowchart illustrating an example process for purchasing a second A/V device according to various aspects of the present disclosure.

FIG. 10 is a flowchart illustrating an example process for purchasing a second A/V device according to various aspects of the present disclosure. In many embodiments, a client device (e.g., the second client devices 215, 217) may receive the neighborhood alert signal that includes image data (e.g., first image data 406) and a model identifier associated with an A/V device (e.g., the first A/V device 210) that captured the image data. As described above, the neighborhood alert signal may be displayed using a neighborhood platform running on a user's client device. For example, the neighborhood platform may include a neighborhood alert feed that allows members to engage with the neighborhood alert signal as described below. In many embodiments, the process 1000 may be performed on a client device (e.g., the second client devices 215, 217) and/or any other client device that receives a neighborhood alert signal.

In reference to FIG. 10, the process 1000 may include receiving (block B1002) a neighborhood alert signal 520 from the server(s) 224 at the second client devices 215, 217. In many embodiments, the neighborhood alert signal 520 may include first image data 406 captured by a camera 452 of the first A/V device 210 and a model identifier associated with the first A/V device 210, as described above. The process 1000 may also include displaying (block B1004) the first image data 406 and the model identifier associated with the first A/V device 210, as described above. Further, the process 1000 may include displaying (block B1006) a hyperlink to a website that provides information about A/V devices corresponding to the model identifier, as described above. For example, in further reference with FIG. 7, the second client device 215, 217 may display (block B1004), on the display 619, the first image data 406 captured by the camera 452 of the first A/V device 210 and the model identifier associated with the first A/V device 210. In addition, the second client device 215, 217 may display (block B1006), on the display 619, the hyperlink to a website that provides information about A/V devices corresponding to the model identifier. In further reference to process 1000, the second client devices 215, 217 may receive from a second user associated with the second client devices 215, 217, an input selection (block B1008) of the hyperlink that may be stored in the memory 615 as input selection data 629. In some embodiments, the input selection may be transmitted to the server(s) 224 (and/or the web server(s) 252), as described above. Although described herein as receiving the neighborhood alert signal that includes the first image data 406 and the model identifier associated with the first A/V device 210, in some embodiments the second A/V device may receive the first image data 406 and the model identifier associated with the first A/V device 210 without receiving a neighborhood alert signal. For example, the first image data 406 and the model identifier associated with the first A/V device 210 may be received independently from the neighborhood alert signal 520. Further, in various embodiments, the second A/V device may receive the first image data 406 and the model identifier associated with the first A/V device 210 from one or more servers. For example, the second A/V device may receive the first image data 406 and the model identifier associated with the first A/V device 210 from the same server or from different servers.

In further reference to FIG. 10, the process 1000 may include determining (block B1010) a level of engagement with the first image data 406. For example, in further reference with FIG. 7, the second client device 215, 217 may track and/or determine (block 1010) a level engagement by the second user with the first image data 406 that may be stored in the memory 615 as engagement level data 621. In various embodiments, the engagement level data 621 may be transmitted to the server(s) 224 (and/or the web server(s) 252). In various embodiments, the level of engagement may include various user engagement metrics such as, but not limited to, an indication of whether the second user has commented on the first image data 406, shared the first image data 406 with at least one additional user of the network of users, viewed the first image data 406 beyond a predetermined length of time, provided positive (or negative) affirmation regarding the first image data 406, hovered a pointer over the first image data 406 beyond a predetermined length of time, scrolled past the first image data 406 and then returned to the first image data 406, etc. As further described below, the level of engagement may be used by the server(s) 224 (and/or the web server(s) 252) to determine a discount amount for purchasing a second A/V device corresponding to the model identifier.

With further reference to FIG. 10, the process 1000 may include displaying (block B1012) a website with information about A/V devices corresponding to the model identifier. For example, in response to receiving (block B1008) the input selection of the hyperlink, the second client device 215, 217 may display (block B1012), on the display 619, the website having information about A/V devices corresponding to the model identifier, as described above. The process 1000 may also include receiving (block B1014) a purchase inquiry for a second A/V device corresponding to the model identifier. For example, the second client device 215, 217 may display, on the display 619, a checkout page for receiving (block B1014) the purchase inquiry from the second user. In many embodiments, the purchase inquiry may be stored as purchase inquiry data 627, as described above. In some embodiments, the purchase inquiry data 627 may include payment information such as, but not limited to, credit card, bank account, billing, and/or shipping information for purchasing the second A/V device corresponding to the model identifier. In various embodiments, the second client device(s) 215, 217 may transmit the purchase inquiry data 627 for completing the sales transaction for the second A/V device corresponding to the model identifier, as further described below. In some embodiments, the website may facilitate purchasing the second A/V device corresponding to the model identifier. For example, the website may provide a checkout page that receives (block B1014) the purchase inquiry from the second user and allows the second user to transmit payment information using the purchase inquiry data 627 for purchasing the second A/V device corresponding to the model identifier, as further described below.

Figure 11:
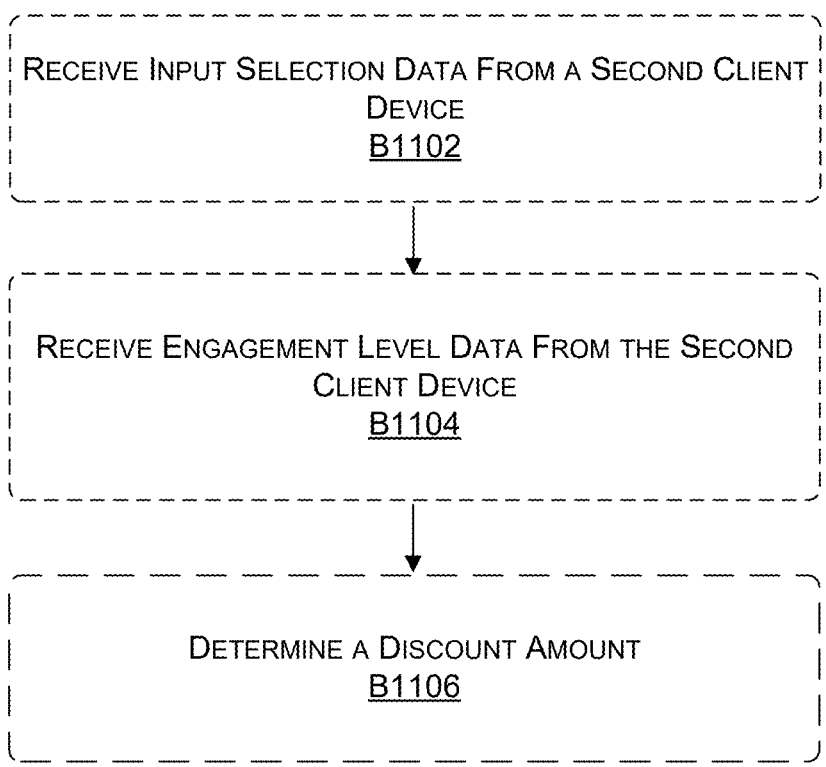
FIG. 11 is flowchart illustrating an example process for determining a discount amount for purchasing a second A/V device according to various aspects of the present disclosure.

FIG. 11 is flowchart illustrating an example process 1100 for determining a discount amount for purchasing a second A/V device according to various aspects of the present disclosure. As described above, the server(s) 224 (and/or the web server(s) 252) may determine a discount amount for purchasing a second A/V device corresponding to the model identifier. In some embodiments, the discount amount may be based on at least engagement with the first image data 406 by the at least one user (e.g., the second user) of the network of users. In some embodiments, the discount amount may be based on location (e.g., first location and/or second location)

and/or the properties of the network of users. The process 1100 may be performed by the server(s) 224 and/or the web server(s) 252. Further, the process 1100 may be performed in addition to the process 900 described in FIG. 9 above. For example, process 1100 may be performed after the web server(s) 252 transmits (block B910) the neighborhood alert signal 520 to the at least one user (e.g., the second user) of the network of users.

In reference to FIG. 11, the process 1100 may include receiving (block B1102) input selection data 629 from the second client devices 215, 217, as described above. For example, the input selection data 629 may include an indication that the second user has selected the hyperlink in the neighborhood alert signal 520. In some embodiments, the process 1100 may also include receiving (block B1104) engagement level data 621 from the second client devices 215, 217. For example, the server(s) 224 may receive (block B1104) from the second client devices 215, 217 engagement level data 621 that indicates the second user's engagement with the first image data 406, as described above. The process 1100 may further include determining (block B1106) a discount amount for purchasing a second A/V device corresponding to the model identifier. In some embodiments, determining (block B1106) the discount amount may be based on at least the first image data 406. For example, the discount amount may be greater when the first image data 406 includes image data representative of images depicting a crime, a particular person, a weapon, etc. In some embodiments, a computer vision process may be used to determine when the first image data 406 includes image data representative of images depicting a crime, a particular person, a weapon, etc., as described above. In some embodiments, determining (block B1106) the discount amount may be based on at least engagement with the first image data 406 by the at least one user of the network of users (e.g., the second user), as indicated by the engagement level data 621. For example, the discount amount may be greater when the at least one user of the network of users (e.g., the second user) has commented on the first image data 406, shared the first image data 406 with at least one additional user of the network of users, viewed the first image data 406 beyond a predetermined length of time, provided positive affirmation regarding the first image data 406, hovered a pointer over the first image data 406 beyond a predetermined length of time, and/or scrolled past the first image data 406 and then has returned to the first image data 406. In some embodiments, determining (block B1106) the discount amount may be based on at least a density of users in the network of users. For example, the discount amount may be inversely proportional to the density of users in the network of users. In some embodiments, determining (block B1106) the discount amount may be based on at least the density of registered A/V devices in the network of users. For example, the discount amount may be inversely proportional to the density of registered A/V devices in the network of users. In some embodiments, determining (block B1106) the discount amount may be based on at least a first location associated with the first A/V device and a second location associated with the second user and/or the second client devices 215, 217. For example, the discount amount may be inversely proportional to the distance between the first location and the second location.

Figure 12:
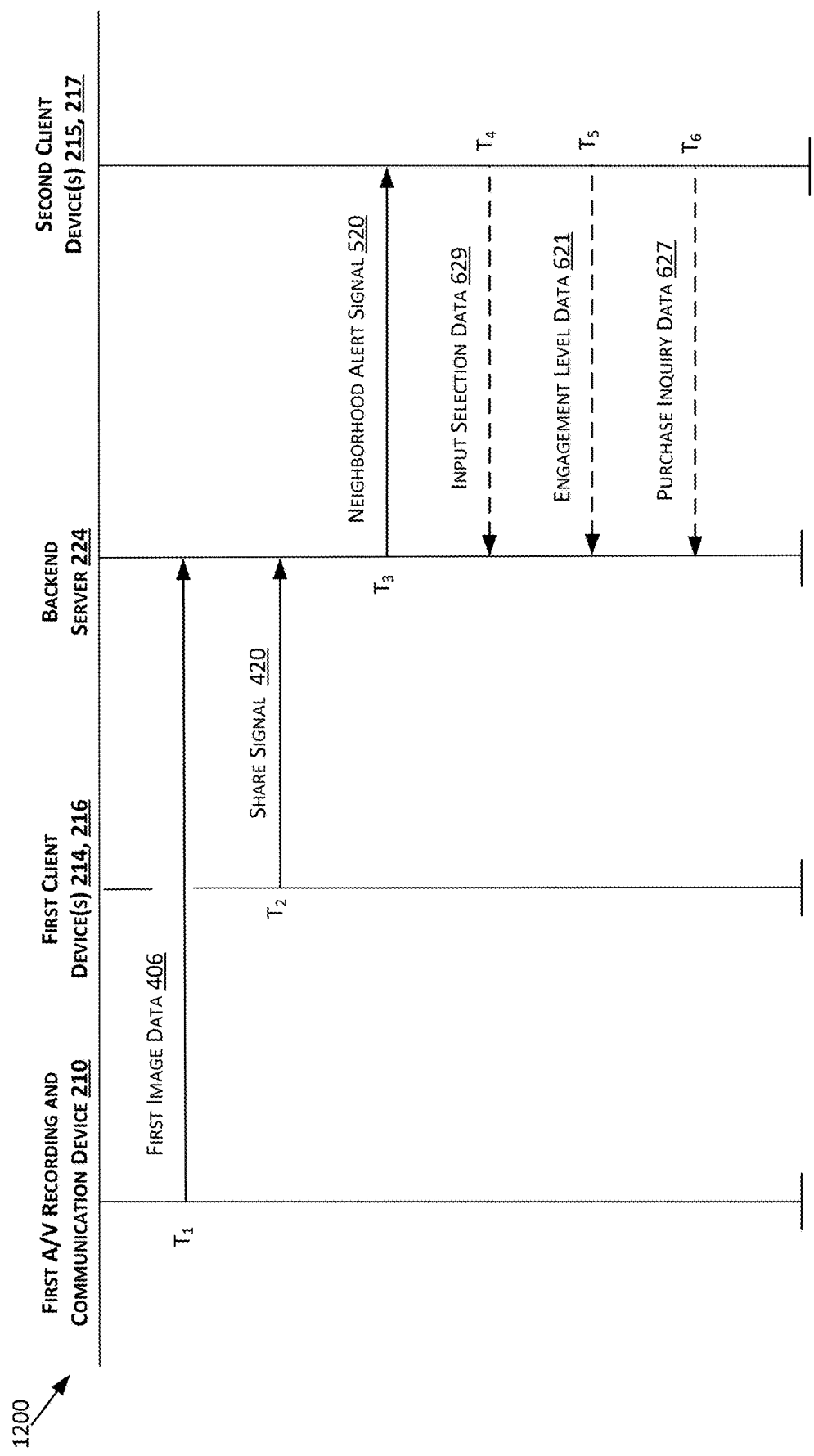
FIG. 12 is a sequence diagram illustrating an example process for purchasing a second A/V device according to various aspects of the present disclosure.

FIG. 12 is a sequence diagram illustrating an example process for purchasing a second A/V device according to various aspects of the present disclosure. The process 1200 may include the first A/V device 210, the first client device (s) 214, 216, a backend device such as the server(s) 224, and the second client device(s) 215, 217. As described above, the first A/V device 210 and the first client device(s) 214, 216 may be associated with a first user. Further, the first A/V device 210 may be associated with a model identifier. In addition, the second client device(s) 215, 217 may be associated with a second user. In many embodiments, the first and second users may be users of the network, as described above.

With reference to FIG. 12, at a time T1, the first A/V device 210 may transmit to the server(s) 224 an output signal 418 that includes the first image data 406, as described above. Further, at a time T2, the first client device(s) 214, 216 may transmit to the server(s) 224 a share signal 420 that includes a command to share the first image data 406 to the network of users, as described above. In various embodiments, time T1 may take place before, after, or at the same time as T2. For example, in some embodiments, the share signal 420 may include a command to share first image data 406 captured in the future (e.g., later in time than T2) by the camera 452 of the first A/V device 210.

As described above, the server(s) 224 may determine the model identifier associated with the first A/V device 210 and generate a neighborhood alert signal 520 that includes the first image data 406 and the model identifier associated with the first A/V device 210. In many embodiments, the neighborhood alert signal 520 may also include a hyperlink to a website that provides information about A/V devices corresponding to the model identifier. In various embodiments, the server(s) 224 may identify at least one user of the network, such as, but not limited to, the second user for receiving the neighborhood alert signal 520. At a time T3, the server(s) 224 may transmit the neighborhood alert signal 520 to a client device of the at least one user of the network. For example, at time T3, the server(s) 224 may transmit the neighborhood alert signal 520 to the second client device(s) 215, 217, as described above. Upon receiving the neighborhood alert signal 520, the second client device 215, 217 may display the first image data, model identifier, and/or the hyperlink for facilitating the purchase of A/V devices corresponding to the model identifier, as described above. For example, at a time T4, the second client device(s) 215, 217 may transmit to the server(s) 224 input selection data 629 that indicates that the second user has selected the hyperlink redirecting the second client device(s) 215, 217 to the website. In some embodiments, at a time T5, the second client device(s) 215, 217 may transmit to the server(s) 224 engagement level data 621 that may be used to determine a discount in purchasing a second A/V device corresponding to the model identifier, as described above. In various embodiments, time T4 may take place before, after, or at the same time as T5. In addition, at a time T6, the second client device(s) 215, 217 may transmit to the server(s) 224 purchase inquiry data 627 for completing a sales transaction for the second A/V device corresponding to the model identifier, as described above.

As described above, one aspect of the present embodiments includes the realization that users of audio/video (A/V) devices may from time to time desire to share video footage recorded by their devices. For example, when an A/V device records video footage of suspicious activity, or even criminal activity, a user viewing the footage may desire to alert his or her neighbors to the possible danger posed by the person(s) involved in the suspicious or criminal activity. It would be advantageous, then, to enhance the functionality of A/V devices by facilitating easy sharing of video footage recorded by such devices with one's neighbors. In another example, an A/V device may record video footage of activity that may be of interest to the user's friends and family (e.g., images of children playing in the yard). It would be advantageous, then, to enhance the functionality of A/V devices by facilitating easy sharing of video footage recorded by such devices with one's friends and family. The present embodiments, as described in detail below, provide these, and other, enhancements. In particular, the present embodiments improve upon and solve the problem of video footage captured by A/V devices being accessible only to the owner of the A/V device, which limits the ability of such devices to help stop crime.

Another aspect of the present embodiments includes the realization that in current A/V devices other than the present embodiments, members of a neighborhood (may also be referred to as "network of users") receiving the shared video footage may not own an A/V device. For example, a neighborhood may include a grouping of members (may also be referred to as "users") sharing information using a neighborhood platform running on each user's client device. The neighborhood platform may include a neighborhood alert feed that allows members to post videos, photos, and/or texts to alert other members of activity in the neighborhood using a share signal. Some members may own A/V device(s) that record video footage that may be shared to other members, while some members, may not own their own A/V device(s). However, the more users of a neighborhood that own A/V devices, the more video footage may be recorded and shared to the neighborhood, which may increase the safety of the neighborhood. The present embodiments solve these problems by providing a neighborhood alert signal that shares video footage along with a model identifier of the A/V device that captured the shared video footage. Further, the neighborhood alert signal may include a hyperlink to more information about A/V devices such as, but not limited, to A/V device corresponding to the model identifier. In addition, the neighborhood alert signal may allow for a person receiving the neighborhood alert signal to purchase one or more A/V devices, including, but not limited to, A/V devices corresponding to the model identifier. The present embodiments thus advantageously encourage more members of a neighborhood to purchase A/V devices and contribute video footage to the neighborhood to improve neighborhood safety. The present embodiments provide these advantages and enhancements, as described herein.

Figure 13:
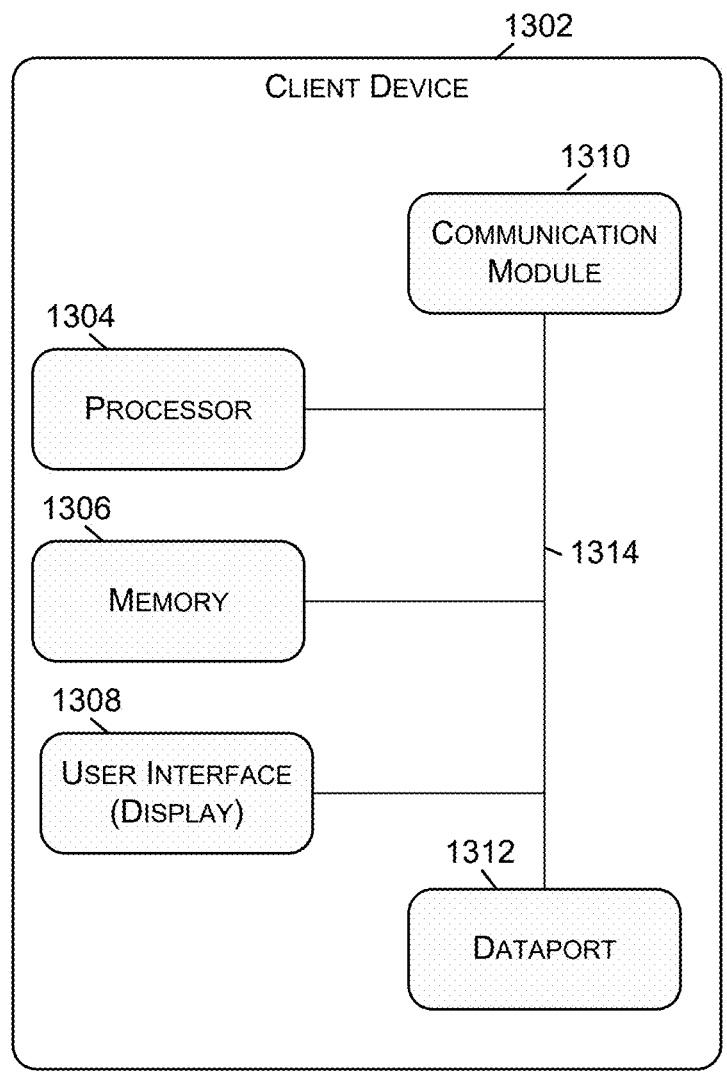
FIG. 13 is a functional block diagram of a client device on which the present embodiments may be implemented according to various aspects of the present disclosure.

FIG. 13 is a functional block diagram of a client device 1302 on which the present embodiments may be implemented according to various aspects of the present disclosure. The first client device(s) 214, 216 and/or the second client device(s) 215, 217 described above may include some or all of the components and/or functionality of the client device 1302. The client device 1302 may comprise, for example, a smartphone.

With reference to FIG. 13, the client device 1302 includes a processor 1304, a memory 1306, a user interface 1308, a communication module 1310, and a dataport 1312. These components are communicatively coupled together by an interconnect bus 1314. The processor 1304 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1306 may include both operating memory, such as random-access memory (RAM), as well as data storage, such as read-only memory (ROM), hard drives, flash memory, or any other suitable memory/storage element. The memory 1306 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1304 and the memory 1306 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1304 may be connected to the memory 1306 via the dataport 1312.

The user interface 1308 may include any user interface or presentation elements suitable for a smartphone and/or a portable computing device, such as a keypad, a display screen, a touchscreen, a microphone, and a speaker. The communication module 1310 is configured to handle communication links between the client device 1302 and other, external devices or receivers, and to route incoming/outgoing data appropriately. For example, inbound data from the dataport 1312 may be routed through the communication module 1310 before being directed to the processor 1304, and outbound data from the processor 1304 may be routed through the communication module 1310 before being directed to the dataport 1312. The communication module 1310 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1312 may be any type of connector used for physically interfacing with a smartphone and/or a portable computing device, such as a mini-USB port or an IPHONE®/IPOD® 30-pin connector or LIGHTNING® connector. In other embodiments, the dataport 1312 may include multiple communication channels for simultaneous communication with, for example, other processors, servers, and/or client terminals.

The memory 1306 may store instructions for communicating with other systems, such as a computer. The memory 1306 may store, for example, a program (e.g., computer program code) adapted to direct the processor 1304 in accordance with the present embodiments. The instructions also may include program elements, such as an operating system. While execution of sequences of instructions in the program causes the processor 1304 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 14:
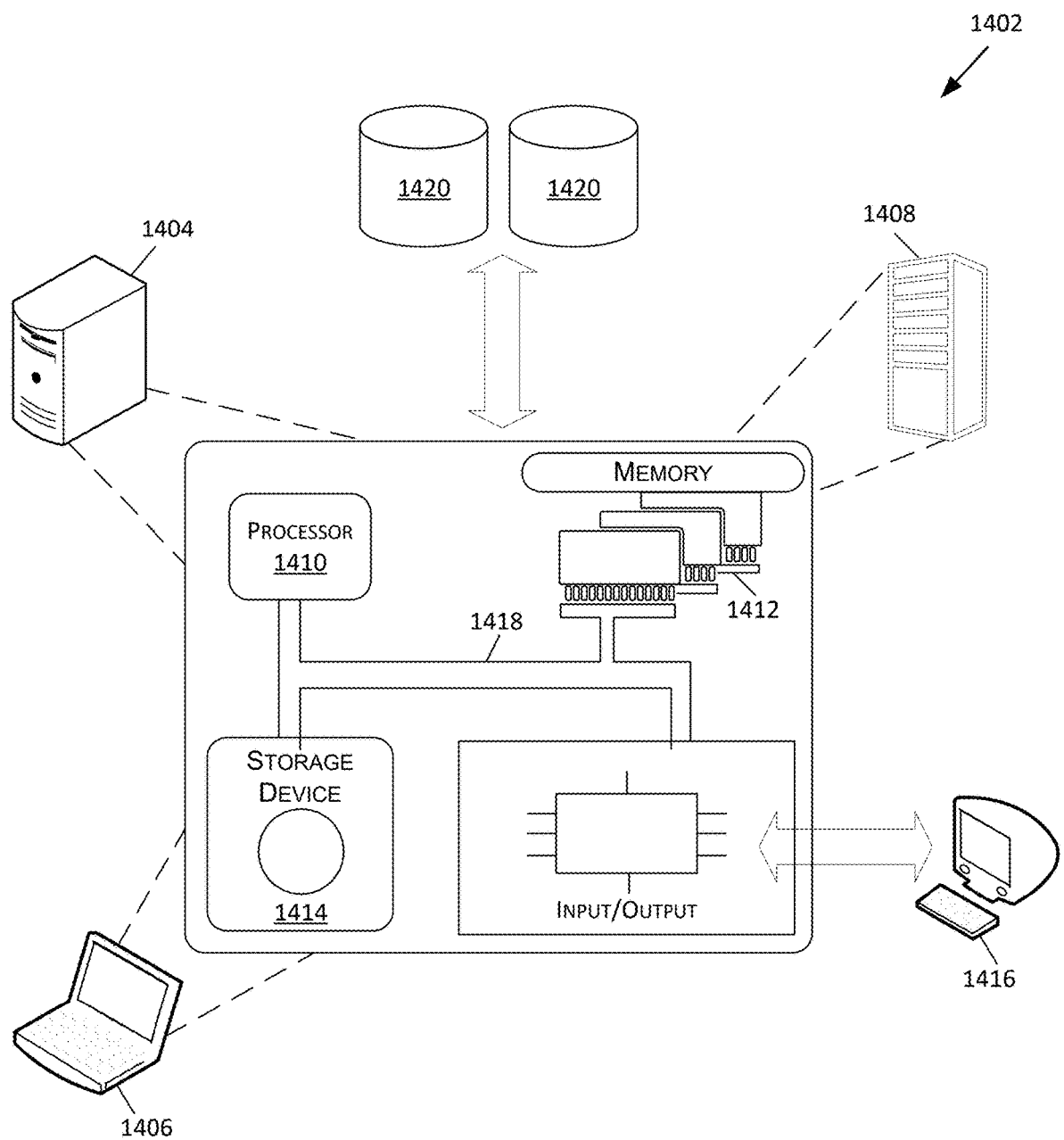
FIG. 14 is a functional block diagram of a general-purpose computing system on which the present embodiments may be implemented according to various aspects of present disclosure.

FIG. 14 is a functional block diagram of a general-purpose computing system on which the present embodiments may be implemented according to various aspects of the present disclosure. The computer system 1402 may be embodied in at least one of a personal computer (also referred to as a desktop computer) 1404, a portable computer (also referred to as a laptop or notebook computer) 1406, and/or a server 1408 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1402 may execute at least some of the operations described above. The computer system 2102 may include at least one processor 1410, memory 1412, at least one storage device 1414, and input/output (I/O) devices 1416. Some or all of the components 1410, 1412, 1414, 1416 may be interconnected via a system bus 1418. The processor 1410 may be single- or multi-threaded and may have one or more cores. The processor 1410 execute instructions, such as those stored in the memory 1412 and/or in the storage device 1414. Information may be received and output using one or more I/O devices 1416.

The memory 1412 may store information, and may be a computer-readable medium, such as volatile or non-volatile memory. The storage device(s) 1414 may provide storage for the system 2102 and, in some embodiments, may be a computer-readable medium. In various aspects, the storage device(s) 1414 may be a flash memory device, a hard disk device, an optical disk device, a tape device, or any other type of storage device.

The I/O devices 1416 may provide input/output operations for the system 1402. The I/O devices 1416 may include a keyboard, a pointing device, and/or a microphone. The I/O devices 1416 may further include a display unit for displaying graphical user interfaces, a speaker, and/or a printer. External data may be stored in one or more accessible external databases 1420.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

In a first aspect, a method for communicating in a network is provided, the method comprising receiving, from a first audio/video (A/V) recording and communication device (A/V device), at one or more servers in network communication with the first A/V device, first image data captured by a camera of the first A/V device; receiving, from a first client device associated with the first A/V device, at the server(s), a command to share the first image data with a network of users; determining a model identifier associated with the first A/V device; and transmitting the first image data and the model identifier associated with the first A/V device to a second client device of at least one user of the network of users.

In an embodiment of the first aspect, the method further comprises transmitting, to the second client device, a hyperlink to a website that provides information about a second A/V device corresponding to the model identifier.

In another embodiment of the first aspect, the method further comprises determining a discount amount for purchasing a second A/V device corresponding to the model identifier.

In another embodiment of the first aspect, wherein determining the discount amount is based on at least engagement with the first image data by the at least one user of the network of users.

In another embodiment of the first aspect, the discount amount is greater when the at least one user of the network of users has commented on the first image data.

In another embodiment of the first aspect, the discount amount is greater when the at least one user of the network of users has shared the first image data to at least one additional user of the network of users.

In another embodiment of the first aspect, the method further comprises determining the model identifier associated with the first A/V device using source identifying data received from the first client device, wherein the source identifying data includes the model identifier associated with the first A/V device.

In another embodiment of the first aspect, the method further comprises transmitting the neighborhood alert signal to the second client device using an update signal, wherein the update signal causes the second client device to download updated alert information from the server(s).

In a second aspect, a method for communicating in a network is provided, the method comprising: receiving, from one or more servers, at a second client device, first image data captured by a camera of a first A/V recording and communication device (A/V device) associated with a first client device, and a model identifier associated with the first A/V device; displaying, on a display of the second client device, the first image data captured by the camera of the first A/V device and the model identifier associated with the first A/V device; and displaying, on the display of the second client device, a hyperlink to a website that provides information about a second A/V device corresponding to the model identifier.

In an embodiment of the second aspect, the method further comprises receiving an input selection of the hyperlink.

In another embodiment of the second aspect, the method further comprises, after receiving the input selection of the hyperlink, displaying, on the display of the second client device, the website having information about the second A/V device corresponding to the model identifier.

In another embodiment of the second aspect, the method further comprises determining a level of engagement by a second user associated with the second client device with the first image data, and generating and transmitting, from the second client device to the server(s), engagement level data.

In another embodiment of the second aspect, the engagement level data includes an indication of whether the second user has commented on the first image data.

In another embodiment of the second aspect, the engagement level data includes an indication of whether the second user has shared the first image data to at least one additional user of a network of users.

In another embodiment of the second aspect, the engagement level data includes an indication of whether the second user has viewed the first image data beyond a predetermined length of time.

In another embodiment of the second aspect, the engagement level data includes an indication of whether the second user has provided positive affirmation regarding the first image data.

In another embodiment of the second aspect, the engagement level data includes an indication of whether the second user has hovered a pointer over the first image data beyond a predetermined length of time.

In another embodiment of the second aspect, the engagement level data includes an indication of whether the second user has scrolled past the first image data and then has returned to the first image data.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

One aspect of the present embodiments includes the realization that users of audio/video (A/V) recording and communication devices (A/V devices) may from time to time desire to share video footage recorded by their devices. For example, when an A/V device records video footage of suspicious activity, or even criminal activity, a user viewing the footage may desire to alert his or her neighbors to the possible danger posed by the person(s) involved in the suspicious or criminal activity. It would be advantageous, then, to enhance the functionality of A/V devices by facilitating easy sharing of video footage recorded by such devices with one's neighbors. In another example, an A/V device may record video footage of activity that may be of interest to the user's friends and family (e.g., images of children playing in the yard). It would be advantageous, then, to enhance the functionality of A/V devices by facilitating easy sharing of video footage recorded by such devices with one's friends and family. The present embodiments, as described in detail below, provide these, and other, enhancements. In particular, the present embodiments improve upon and solve the problem of video footage captured by A/V devices being accessible only to the owner of the A/V device, which limits the ability of such devices to help stop crime.

Another aspect of the present embodiments includes the realization that in current A/V devices other than the present embodiments, members of a neighborhood (may also be referred to as "network of users") receiving the shared video footage may not own an A/V device. For example, a neighborhood may include a grouping of members (may also be referred to as "users") sharing information using a neighborhood platform running on each user's client device. The neighborhood platform may include a neighborhood alert feed that allows members to post videos, photos, and/or texts to alert other members of activity in the neighborhood using a share signal. Some members may own A/V device(s) that record video footage that may be shared to other members, while some members may not own such A/V device(s). However, when more users in a neighborhood own A/V devices, more video footage may be recorded and shared to the neighborhood, which may increase the safety of the neighborhood. The present embodiments solve these problems by providing a neighborhood alert signal that shares video footage along with a model identifier of the A/V device that captured the shared video footage. Further, the neighborhood alert signal may include a hyperlink to more information about A/V devices such as, but not limited, to A/V device corresponding to the model identifier. In addition, the neighborhood alert signal may allow a person receiving the neighborhood alert signal to purchase one or more A/V devices, including, but not limited to, A/V devices corresponding to the model identifier. The present embodiments thus advantageously encourage more members of a neighborhood to purchase A/V devices and contribute video footage to the neighborhood to improve neighborhood safety. The present embodiments provide these advantages and enhancements, as described above.

As described herein, the present sharing video footage from audio/video A/V devices using neighborhood alert signals may include model identifiers of the A/V devices that captured the shared video footage. For example, a first A/V device may be associated with a model identifier such as, but not limited to, a make, model, serial number, product version, and/or any other identifier that identifies a particular product classification of A/V devices. In many embodiments, the first A/V device may be configured to capture first image data using a camera having a field of view and further configured to transmit the first image data to one or more servers. In various embodiments, a first user may use a first client device to transmit a share signal indicating the first user's desire to share the first image data with a neighborhood (may also be referred to as a "network of users"). Upon receiving the share signal, the server(s) may determine the model identifier associated with the first A/V device. Further, the server(s) may generate a neighborhood alert signal that includes the first image data and the model identifier associated with the first A/V device. In addition, the server(s) may transmit the neighborhood alert signal to at least one user of the network of users (e.g., a second user) in sharing the first image data. As described further below, the neighborhood alert signal that includes the model identifier may be displayed on a client device (e.g., a second client device) associated with the at least one user of the network of users. In some embodiments, the neighborhood alert signal may also include a hyperlink to a website that provides information about A/V devices (e.g., a second A/V device) corresponding to the model identifier.

In many embodiments, the neighborhood alert signal and/or the first image data may facilitate the purchase of A/V devices corresponding to the model identifier. For example, a second user may receive the neighborhood alert signal and may be provided with information about A/V devices corresponding to the model identifier. Further, in various embodiments, a discount amount may be determined and applied to the purchase of A/V devices corresponding to the model identifier (e.g., a second A/V device) based on various factors such as, but not limited to, the contents of the first image data, the second user's engagement with the first image data, and/or a density of users in the network of users, as described herein. Thus, shared video footage that includes model identifiers may encourage and facilitate other users to purchase A/V devices and to contribute additional video footage to the neighborhood, thereby increasing neighborhood safety, as described herein.

What is claimed is:

1. A method comprising:
   storing, by a system, first location data associated with a first electronic device;
   storing, by the system, second location data associated with a first user device;
   receiving, by the system, image data generated by the first electronic device;
   receiving, from a second user device, a command to share the image data;
   based at least in part on the receiving of the command, determining, by the system, model identifier data associated with the first electronic device;
   selecting the first user device based at least in part on the first location data and the second location data;
   based at least in part on the selecting of the first user device, sending, by the system and to the first user device, the image data, and the model identifier data;
   wherein the sending of the model identifier data to the first user device is based on the determining of the model identifier data associated with the first electronic device.

2. The method of claim 1, further comprising sending, to the first user device, first data representing a hyperlink to a website that provides information about a second electronic device associated with the model identifier data.

3. The method of claim 1, further comprising:
   determining a discount amount for purchasing a second electronic device associated with the model identifier; and
   sending, to the first user device, first data representing the discount amount.

4. The method of claim 3, wherein the determining of the discount amount comprises determining the discount amount based on at least in part on an engagement associated with the image data.

5. The method of claim 4, further comprising:
   determining that the engagement includes a comment associated with the image data; and
   determining to increase the discount amount from a first amount to a second amount based at least in part on the comment associated with the image data.

6. The method of claim 4, further comprising:
   determining that the engagement includes a sharing of the image data; and
   determining to increase the discount amount from a first amount to a second amount based at least in part on the sharing of the image data.

7. The method of claim 1, wherein the model identifier data represents at least one of:
   a make of the first electronic device;
   a model of the first electronic device;
   a serial number associated with the first electronic device;
   a product version associated with the first electronic device; or
   a product classification associated with the first electronic device.

8. The method of claim 1, further comprising sending, to the first user device, first data representing an advertisement associated with the first electronic device.

9. The method of claim 1, further comprising:
receiving source identifier data from the second user device,
wherein determining the model identifier data is based at least in part on the source identifier data.

10. The method of claim 1, further comprising:
determining a format associated with the image data,
wherein the determining of the model identifier data is further based at least in part on the format.

11. The method of claim 1, further comprising: receiving, from the first electronic device, device identifier data associated with the first electronic device, wherein the determining of the model identifier data is further based at least in part on the device identifier data.

12. The method of claim 1, further comprising sending, by the system and to the first user device, first data indicating that the model identifier data is associated with the image data.

13. The method of claim 1, wherein the selecting the first user device comprises:
determining, based at least in part on the first location data, that the first electronic device is associated with a first location;
determining, based at least in part on the second location data, that the first user device is associated with a second location;
determining that the second location is within an area that includes the first location; and
selecting the first user device based at least in part on the second location being within the area that includes the first location.

14. The method of claim 1, wherein the selecting the first user device comprises:
determining, based at least in part on the first location data, that the first electronic device is associated with a first location;
determining, based at least in part on the second location data, that the second electronic device is associated with a second location;
determining that the second location is within an area that includes the first location;
determining that the first user device is associated with the second electronic device; and
selecting the first user device based at least in part on the first user device being associated with the second electronic device.

15. The method of claim 1, further comprising sending, by the system and to the first user device, a command to display a model identifier represented by the model identifier data with an image represented by the image data.

16. The method of claim 1, where the sending of the model identifier data to the first user device occurs with the sending of the image data to the first user device.

17. The method of claim 1, further comprising generating a hyperlink to a website that provides information about a product classification associated with the model identifier, wherein the hyperlink to the website that provides information about the product classification comprises a hyperlink to a website on which a second electronic device associated with the model identifier data can be purchased.

18. The method of claim 1, wherein the determining, by the system the model identifier data associated with the first electronic device comprises receiving the model identifier from the second user device in the command.

19. The method of claim 1, wherein the determining, by the system the model identifier data associated with the first electronic device comprises:
determining an identity of a user associated with the first user device; and
determining the model identifier data as being associated with the first user device.

20. The method of claim 1, wherein the model identifier is determined based on at least one of: formatting, quality, or other property associated with the received command.

21. The method of claim 1, wherein the model identifier is determined based on a format of the image data.

22. A system comprising:
one or more processors; and
a memory coupled to the one or more processors, the memory including instructions that when executed by the one or more processors, cause the one or more processors to:
store first location data associated with a first electronic device;
store second location data associated with a first user device;
receive image data generated by the first electronic device;
receive, from a second user device, a command to share the image data;
based at least in part on receiving the command, determine model identifier data associated with the first electronic device;
select the first user device based at least in part on the first location data and the second location data; and
based at least in part on selecting the first user device, send to the first user device, the image data, and the model identifier data.

23. The system of claim 22, wherein the instructions further cause the one or more processors to send, to the first user device, first data representing a hyperlink to a website that provides information about a second electronic device associated with the model identifier data.

24. The system of claim 22, wherein the instructions further cause the one or more processors to: determine a discount amount for purchasing a second electronic device associated with the model identifier; and send first data representing the discount amount to the first user device.

25. The system of claim 24, wherein to determine the discount amount the instructions further cause the one or more processors to determine the discount amount based on at least in part on an engagement associated with the image data.

26. The system of claim 25, wherein the instructions further cause the one or more processors to:
determine that the engagement includes a comment associated with the image data; and
determine to increase the discount amount from a first amount to a second amount based at least in part on the comment associated with the image data.

27. The system of claim 25, wherein the instructions further cause the one or more processors to:
determine that the engagement includes a sharing of the image data; and
determine to increase the discount amount from a first amount to a second amount based at least in part on the sharing of the image data.

* * * * *